US008566551B2

(12) United States Patent
Uratani et al.

(10) Patent No.: US 8,566,551 B2
(45) Date of Patent: Oct. 22, 2013

(54) INFORMATION APPARATUS AND METHOD FOR CONTROLLING THE SAME

(75) Inventors: Ikuo Uratani, Kaisei (JP); Kiichiro Urabe, Isehara (JP); Hiroshi Taninaka, Odawara (JP); Shoji Sugino, Odawara (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 12/746,553

(22) PCT Filed: May 28, 2010

(86) PCT No.: PCT/JP2010/003592
§ 371 (c)(1),
(2), (4) Date: Jun. 7, 2010

(87) PCT Pub. No.: WO2011/148428
PCT Pub. Date: Dec. 1, 2011

(65) Prior Publication Data
US 2012/0131276 A1 May 24, 2012

(51) Int. Cl.
G06F 12/02 (2006.01)
G06F 9/44 (2006.01)

(52) U.S. Cl.
USPC .......................................................... 711/170

(58) Field of Classification Search
None
See application file for complete search history.

(56) References Cited

U.S. PATENT DOCUMENTS

2003/0131343 A1* 7/2003 French et al. ................. 717/127
2003/0191919 A1 10/2003 Sato et al.
2005/0144428 A1 6/2005 Rothman et al.
2011/0208855 A1* 8/2011 Robertson et al. ............ 709/224

FOREIGN PATENT DOCUMENTS

EP 1 406 166 A1 4/2004
EP 1 918 814 A2 5/2008
JP 2003-296147 A 10/2003
WO 2008/058159 A2 5/2008

* cited by examiner

Primary Examiner — Gary Portka
(74) Attorney, Agent, or Firm — Mattingly & Malur, PC

(57) ABSTRACT

An object is to efficiently set configurations of a storage apparatus. Provided is an information apparatus communicably coupled to a storage apparatus 10, which validates a script executed by the storage apparatus 10 for setting a configuration of the storage apparatus 10, the information apparatus generating configurations of the storage apparatus 10 when after each command described in a script is executed sequentially; and performing consistency validation on the script by determining whether or not the command described in the script is normally executable in a case the command is executed on an assumption that the storage apparatus 10 has the configuration immediately before the execution.

14 Claims, 20 Drawing Sheets

INFORMATION PROCESSING SYSTEM 1

Fig. 16

LOGICAL UNIT MANAGEMENT TABLE 1600

| STORAGE PORT ID | LUN | LDEV NUMBER | STORAGE CAPACITY (TB) |
|---|---|---|---|
| ⋮ | ⋮ | ⋮ | ⋮ |
| 00:00:00:60:71:00:05:02 | 0 | 11 | 2 |
| | | 12 | 2 |
| | | 13 | 2 |
| | | 14 | 2 |
| | | 15 | 2 |
| | 1 | 16 | 1.5 |
| | | 17 | 1.5 |
| 00:00:00:60:71:00:05:03 | 2 | 18 | 1 |
| | | 19 | 1 |
| | | 20 | 1 |
| | | 21 | 1 |
| | | 22 | 1 |
| ⋮ | ⋮ | ⋮ | ⋮ |

Fig. 17

LOGICAL DEVICE MANAGEMENT TABLE 1700

1711　　　1712

| LDEV NUMBER | LOGICAL DEVICE NAME |
|---|---|
| : | : |
| 11 | DEVICE11 |
| 12 | DEVICE12 |
| 13 | DEVICE13 |
| 14 | DEVICE14 |
| 15 | DEVICE15 |
| 16 | NOT SET |
| 17 | NOT SET |
| 18 | NOT SET |
| 19 | NOT SET |
| 20 | NOT SET |
| 21 | NOT SET |
| 22 | NOT SET |
| : | : |

Fig. 18

PORT MANAGEMENT TABLE 1800

1811　　　1812

| STORAGE PORT ID | STORAGE PORT NAME |
|---|---|
| : | : |
| 00:00:00:60:71:00:05:02 | Port11 |
| 00:00:00:60:71:00:05:03 | Port12 |
| : | : |

SCRIPT EXAMPLE raidcfg -a reg -o ldev -pldev 0 -ppg PG1-1
raidcfg -a set -o ldev -pldev 0 -pname VOLUME1
raidcfg -a reg -o ldev -pldev 1 -ppg PG2-1
raidcfg -a set -o ldev -pldev 1 -pname VOLUME2

Fig. 22

HYPOTHETICAL EXECUTION RESULT TABLE 316

| LDEV NUMBER | STATUS | LOGICAL DEVICE NAME |
|---|---|---|
| ⋮ | ⋮ | ⋮ |
| 11 | GENERATED | DEVICE11 |
| ⋮ | ⋮ | ⋮ |
| 50 | NOT GENERATED | — |
| ⋮ | ⋮ | ⋮ |

Columns: 3161, 3162, 3163

Fig. 23

SYNTAX VALIDATION EXAMPLE raidcfg -a set -o ldev -pldev 1 -pname VL12345678901234567890123456 7890
                                                                                   RANGE ERROR (STRING TOO LONG)

Fig. 24

SPECIFICATION VALIDATION EXAMPLE (EXAMPLE 1)   raidcfg -a del -o port -pport 0
                       COMMAND LINE CANNOT INSTRUCT DELETION OF STORAGE PORT (HARDWARE)

(EXAMPLE 2)   raidcfg -a reg -o ldev -pldev 4090 -pcnt 100 -ppg PG1-1
                       LDEV NUMBER IS SETTABLE WITHIN RANGE OF 0 TO 4095

(EXAMPLE 3)   raidcfg -a reg -o lu -pport CL1-A -plun 5000 -pldev 0
                       LUN IS SETTABLE WITHIN RANGE OF 0 TO 4095

(EXAMPLE 4)   raidcfg -a set -o port -pport 511 -pattr TARGET
                       STORAGE PORT ID IS SETTABLE WITHIN RANGE OF 0 TO 255

Fig. 25

CONSISTENCY VALIDATION EXAMPLE (EXAMPLE 1)
raidcfg -a reg -o ldev -pldev 0 -ppg PG1-1
raidcfg -a set -o ldev -pldev 1 -pname VOLUME1
        ONLY LDEV NUMBER "0" IS GENERATED, AND OPERATION TARGET LDEV "1" DOES NOT EXIST (EXAMPLE 2)
raidcfg -a reg -o ldev -pldev 0 -ppg PG1-1
raidcfg -a reg -o lu -pport CL1-A -plun 0 -pldev 1
ERROR [EX_INVDEV] LDEV#1 has not been registered yet.
        LOGICAL DEVICE (LDEV1) USED FOR LU (LUN0) DOES NOT EXIST (EXAMPLE 3)
raidcfg -a reg -o ldev -pldev 0 -ppg PG1-1
raidcfg -a reg -o lu -pport CL1-A -plun 0 -pldev 0
raidcfg -a set -o lu -plun 1 -pattr RO
        LU (LUN1) FOR WHICH ATTRIBUTE IS TO BE SET DOES NOT EXIST (EXAMPLE 4)
raidcfg -a set -o port CL1-A -pspeed 4G
raidcfg -a set -o port CL1-B -pspeed 4G
ERROR [EX_CMDCHK] Please check DISK status
        STORAGE PORT (CL1-B) FOR WHICH ATTRIBUTE IS TO BE SET DOES NOT EXIST

Fig. 28

HYPOTHETICAL CONFIGURATION INFORMATION TABLE 2800

| LDEV NUMBER | STATUS | LOGICAL DEVICE NAME |
|---|---|---|
| : | : | : |
| 11 | GENERATED | DEVICE11 |
| : | : | : |
| 50 | NOT GENERATED | — |
| : | : | : |

2811, 2812, 2813

INFORMATION APPARATUS AND METHOD FOR CONTROLLING THE SAME

TECHNICAL FIELD

The present invention relates to an information apparatus and a method for controlling an information apparatus, and particularly to a technique for efficiently setting configurations of a storage apparatus.

BACKGROUND ART

In an information processing system including a configuration in which a storage apparatus is communicably coupled to a host computer (an information apparatus) that uses the storage apparatus as a data storage, configurations necessary for the host computer to use the storage apparatus need to be set. Examples of such configurations include a correspondence between a storage area provided by a physical recordable medium such as a hard disk drive and a logical storage area provided to the host computer, and include a correspondence between the logical storage area and a network port of the storage apparatus that the host computer uses as a communication route (path) to access the logical storage area.

For example, Patent Literature (PTL) 1 describes a technique for setting such configurations, which aims to reduce the influence of human error in allocation or deletion of a logical volume. The technique involves: creating a list of settings for a storage device based on a volume operation request from a user; validating the list; executing the volume operation request from the user step-by-step; cancelling the executed settings if execution conditions registered by the user are not met yet; validating the list using actual-volume configuration information acquired in advance with a program for operating the storage device; acquiring the actual-volume configuration information with the program for operating the storage device upon the validation; validating the setting list even when the program for operating the storage device is directly executed; creating virtual-volume configuration information by reflecting a result of execution of the successfully-validated setting list to the actual-volume configuration information acquired in advance; displaying the virtual-volume configuration information; and the like.

CITATION LIST

Patent Literature

PTL 1: Japanese Patent Application Publication No. 2003-296147

SUMMARY OF INVENTION

Technical Problem

The configuration setting described above can be performed, for example, by sending the storage apparatus a script from the host computer or a management device provided to the storage apparatus via a user interface or the like prepared in the host computer or the management device. Here, the script includes description of a group of commands for configuration setting.

However, a consistency error in the script often becomes evident only after the storage apparatus actually executes the script. For example, there occurs an error where the script lacks the description of a certain command needed to be executed before a command described in the script so that the described command can function. In such a case, a user has to rewrite the script and give an execution instruction to the storage apparatus to execute the script again, which forces the user to perform troublesome operations.

Particularly, taking an influence of the configuration setting on other operations into consideration, many storage apparatuses have a limited time range in which commands for configuration setting are allowed to be executed. In such a case, after giving the storage apparatus an instruction to execute the script, the user has to wait for an execution result until the storage apparatus actually executes the script. Further, if a consistency error is found in the execution result, the script has to be executed again, making the user spend a tremendous amount of time for the configuration setting.

The present invention has been made in view of such circumstances, and an objective thereof is to provide an information apparatus and a method for controlling the information apparatus, which are capable of efficient configuration setting for a storage apparatus.

Solution to Problem

An aspect of the present invention for achieving the above objective is an information apparatus communicably coupled to a storage apparatus, which validates a script executed by the storage apparatus for setting a configuration of the storage apparatus. The information apparatus generates configurations of the storage apparatus when after each command described in a script is executed sequentially, and performs consistency validation on the script by determining whether or not the command described in the script is normally executable in a case the command is executed on an assumption that the storage apparatus has the configuration immediately before the execution.

Other problems disclosed herein and solutions thereof will become apparent from the following descriptions such as of the section of Description of Embodiments with reference to the attached drawings.

Advantageous Effects of Invention

According to the present invention, configurations of a storage apparatus can be set efficiently.

BRIEF DESCRIPTION OF DRAWINGS

FIG. 16 is an example of a logical unit management table 1600.

FIG. 17 is an example of a logical device management table 1700.

FIG. 18 is a port management table 1800.

FIG. 22 is an example of a hypothetical execution result table 316.

FIG. 23 is a diagram showing an example of syntax validation.

FIG. 24 is a diagram showing an example of specification validation.

FIG. 25 is a diagram showing an example of consistency validation.

FIG. 28 is an example of a hypothetical configuration information table 2800.

DESCRIPTION OF EMBODIMENTS

Figure 1:
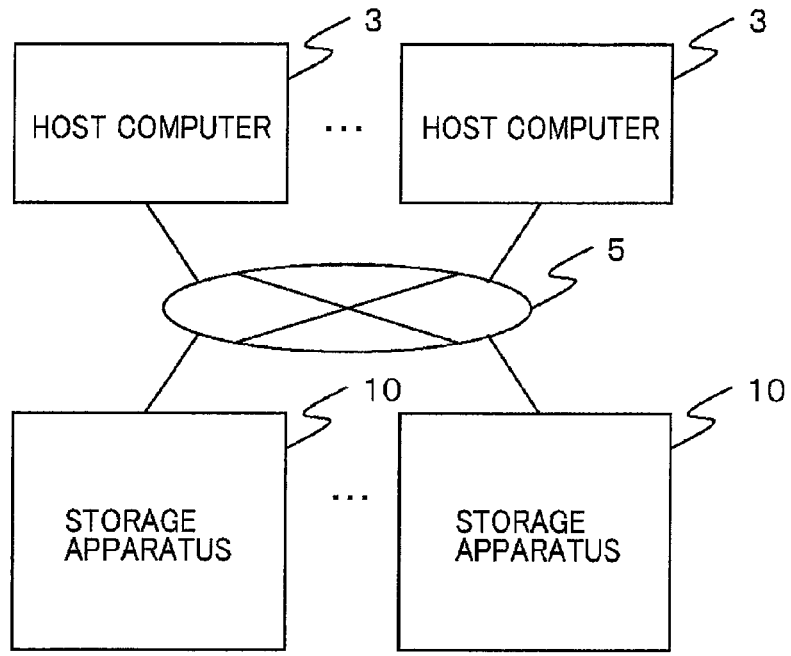
FIG. 1 is a diagram showing a schematic configuration of an information processing system 1.

An Embodiment will be described below with reference to the drawings. FIG. 1 shows a schematic configuration of an information processing system 1 described as the embodiment. As shown in FIG. 1, the information processing system 1 is configured to include at least one host computer 3 (external device) and at least one storage apparatus 10. The host computer 3 and the storage apparatus 10 are communicably coupled to each other through a storage network 5. The host computer 3 is a computer that provides services such as bank's automated teller services or Internet webpage browsing services, for example. The storage apparatus 10 provides a data storage area to, for example, an application program executed in the host computer 3.

The storage network 5 is a LAN (Local Area Network), a WAN (Wide Area Network), a SAN (Storage Area Network), the Internet, a public communication network, a private line, or the like. Communications through the storage network 5 is carried out according to a protocol such as, for example, TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark).

The host computer 3 is configured using a personal computer, a mainframe, an office computer, or the like. To access the aforementioned storage area, the host computer 3 sends the storage apparatus 10 a data frame including a data I/O request (such as a data write request or a data read request) (hereinafter referred to as simply frame).

Figure 2:
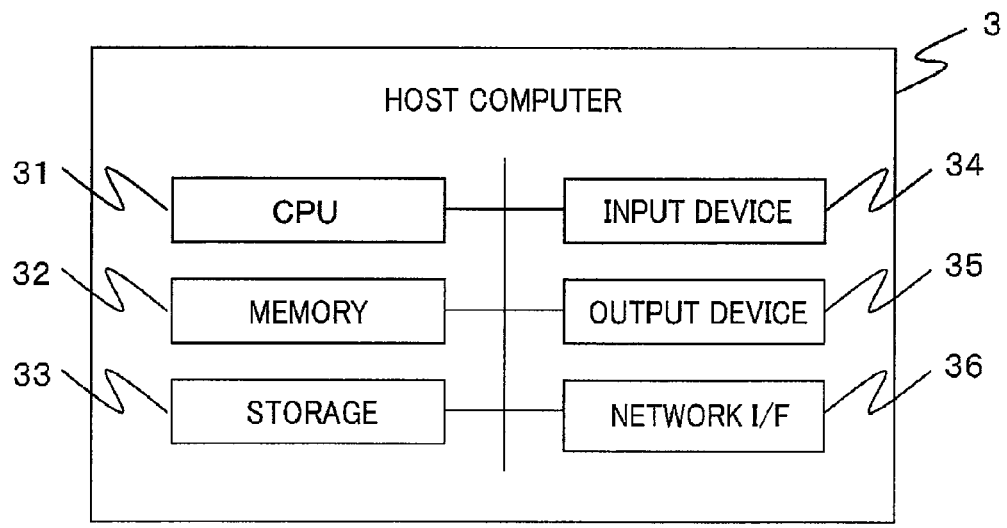
FIG. 2 is a diagram showing a hardware configuration of a host computer 3.

FIG. 2 shows a hardware example of an information apparatus (a computer) usable as the host computer 3. As shown in FIG. 2, the host computer includes a CPU 31, a volatile or nonvolatile memory 32 (RAM or ROM), a storage 33 (e.g., an HDD (Hard Disk Drive) or a semiconductor memory (SSD (Solid State Drive))), an input device 34 such as a keyboard or a mouse, an output device 35 such as a liquid crystal monitor or a printer, and a network interface such as a NIC or an HBA (called a network I/F 36 herein).

Figure 3:
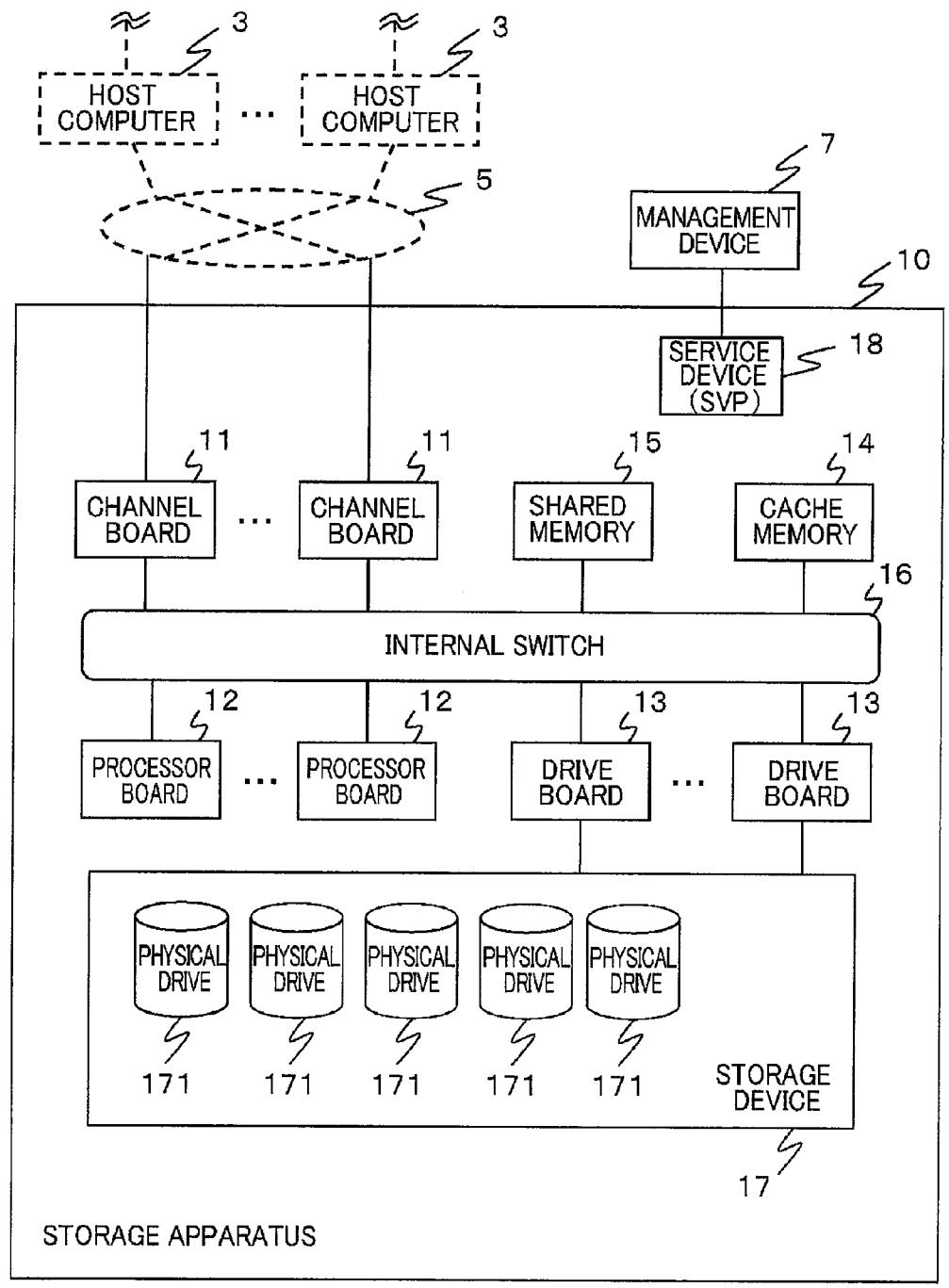
FIG. 3 is a diagram showing a hardware configuration of a storage apparatus 10.

FIG. 3 shows an example of a hardware configuration of the storage apparatus 10. The storage apparatus 10 is, for example, a disk array device. The storage apparatus 10 accesses a recordable medium in response to the aforementioned I/O request sent from the host computer 3, and sends the host computer 3 data or a response. As shown in FIG. 3, the storage apparatus 10 includes at least one channel board 11, at least one processor board 12 (Micro Processor), at least one drive board 13, a cache memory 14, a shared memory 15, an internal switch 16, a storage device 17, and a service device 18 (SVP: SerVice Processor). The channel board 11, the processor board 12, the drive board 13, the cache memory 14, and the shared memory 15 are communicably coupled to one another through the internal switch 16.

The channel board 11 receives a frame sent from the host computer 3, and sends the host computer 3 a frame including a response to processing requested by a data I/O request included in the received frame (e.g., read data, a read completion report, or a write completion report). Note that, in the following descriptions, a frame refers to a Fibre Channel frame (FC frame (FC: Fibre Channel)).

In response to the data I/O request included in the frame received by the channel board 11, the processor board 12 performs processing related to data transfer among the channel board 11, the drive board 13, and the cache memory 14. The processor board 12 performs: passing of data (data read from the storage device 17 and data to be written into the storage device 17) between the channel board 11 and the drive board 13 through the cache memory 14; staging (reading data from the storage device 17) or destaging (writing data of the cache memory 14 into the storage device 17) of data stored in the cache memory 14; and the like.

The cache memory 14 is configured using a RAM (Random Access Memory) capable of high-speed access. The cache memory 14 stores data to be written into the storage device 17 (herein after referred to as write data), data read from the storage device 17 (herein after referred to as read data), and the like. The shared memory 15 stores various pieces of information used to control the storage apparatus 10.

The drive board 13 communicates with the storage device 17 at the time of reading data from the storage device 17 and writing data into the storage device 17. The internal switch 16 is configured using, for example, a high-speed cross-bar switch. Communication through the internal switch 16 is carried out according to a protocol such as Fibre Channel, iSCSI, or TCP/IP.

The storage device 17 is configured including a plurality of physical drives 171 each being a physical recordable medium. The physical drive 171 is configured using a hard disk drive of a type such as SAS (Serial Attached SCSI), SATA (Serial ATA), FC (Fibre Channel), PATA (Parallel ATA), or SCSI, or using hardware such as a semi-conductor memory (SSD). Note that the storage device 17 may be housed in the same casing as the storage apparatus 10 or may be housed in a different casing.

Figure 4:
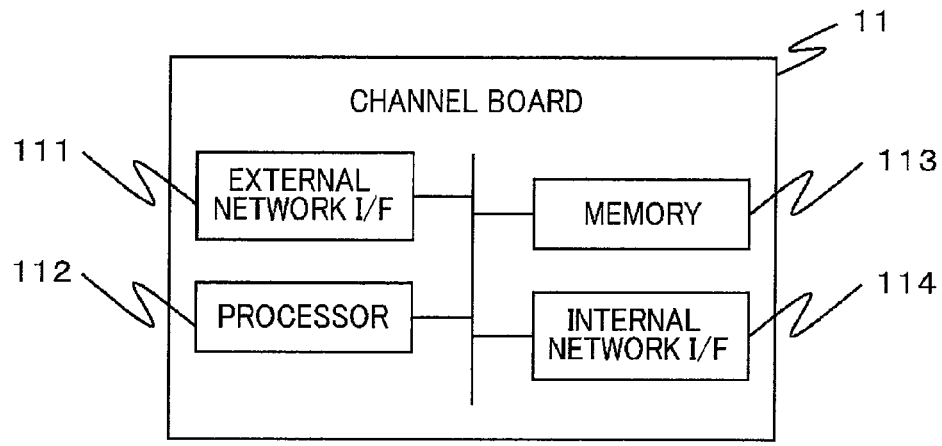
FIG. 4 is a diagram showing a hardware configuration of a channel board 11.

FIG. 4 shows a hardware configuration of the channel board 11. As shown in FIG. 4, the channel board 11 includes: an external network interface (hereinafter referred to as an external network I/F 111) having a port for communication with the host computer 3 (a network port), a processor 112, a memory 113, and an internal network interface (hereinafter referred to as an internal network I/F 114) having a port for communication with the processor board 12 (a network port).

The external network I/F 111 is configured using a NIC (Network Interface Card), an HBA (Host Bus Adaptor), or the like. The processor 112 is configured using a CPU (Central Processing Unit), an MPU (Micro Processing Unit), or the like. The memory 113 is a RAM (Random Access Memory) or a ROM (Read Only Memory). The memory 113 stores a micro-program. Various functions provided by the channel board 11 are implemented when the processor 112 reads the micro-program from the memory 113 and executes the micro-program. The internal network I/F 114 communicates with the processor board 12, the drive board 13, the cache memory 14, and the shared memory 15 through the internal switch 16.

Figure 5:
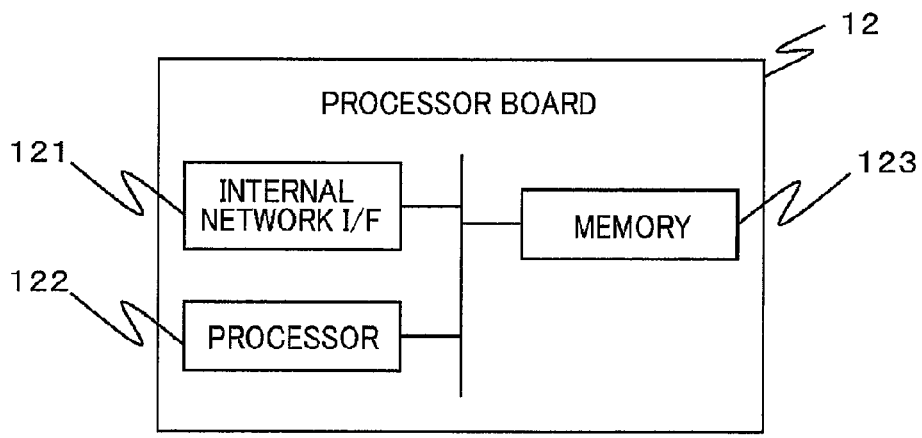
FIG. 5 is a diagram showing a hardware configuration of a processor board 12.

FIG. 5 shows a hardware configuration of the processor board 12. The processor board 12 includes an internal network interface (hereinafter referred to as an internal network I/F 121), a processor 122, and a memory 123 (local memory). The processor 122 can access the memory 123 with a higher performance (at a higher speed) than that for accessing the shared memory 15. The memory 123 stores a micro-program. Various functions provided by the processor board 12 are implemented when the processor 122 reads the micro-program from the memory 123 and executes the micro-program.

The internal network I/F 121 communicates with the channel board 11, the drive board 13, the cache memory 14, and the shared memory 15 through the internal switch 16. The processor 122 is configured using a CPU, an MPU, DMA (Direct Memory Access), or the like. The memory 123 is a RAM or a ROM. The processor 122 can access both of the memory 123 and the shared memory 15.

Figure 6:
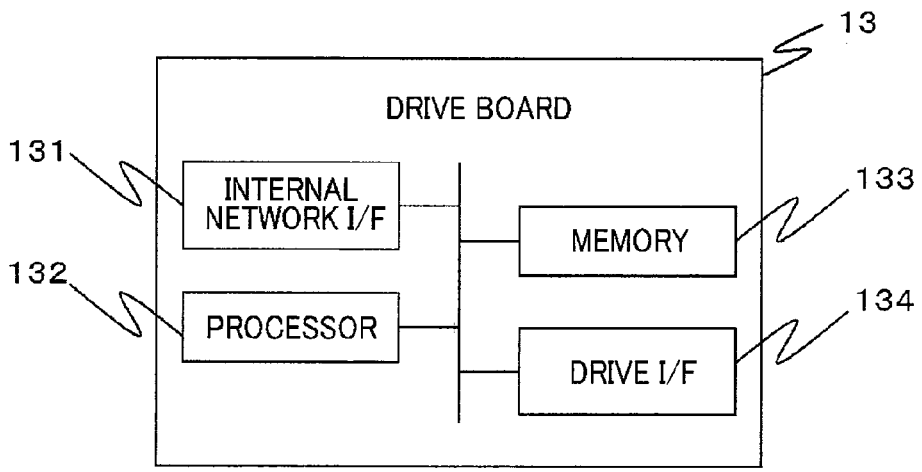
FIG. 6 is a diagram showing a hardware configuration of a drive board 13.

FIG. 6 shows a hardware configuration of the drive board 13. The drive board 13 includes an internal network interface (hereinafter referred to as an internal network I/F 131), a processor 132, a memory 133, and a drive interface (hereinafter referred to as a drive I/F 134). The memory 133 stores a micro-program. Various functions provided by the drive board 13 are implemented when the processor 132 reads the micro-program from the memory 133 and executes the micro-program. The internal network I/F 131 communicates with the channel board 11, the processor board 12, the cache memory 14, and the shared memory 15 through the internal switch 16. The processor 132 is configured using a CPU, an MPU, or the like. For example, the memory 133 is a RAM or a ROM. The drive I/F 134 communicates with the storage device 17.

The service device 18 shown in FIG. 3 performs control and status monitoring of the components of the storage apparatus 10. The service device 18 is a personal computer, an office computer, or the like. The service device 18 communicates, as needed, with the components of the storage apparatus 10, such as the channel board 11, the processor board 12, the drive board 13, the cache memory 14, the shared memory 15, and the internal switch 16 through the internal switch 16 or communication means such as a LAN. The service device 18 acquires operation information and the like from the components of the storage apparatus 10, and provides the acquired information to a management device 7. Further, in accordance with control information and operation information sent from the management device 7, the service device 18 performs setting, control, and maintenance (including software installation and update) of the components.

The management device 7 is a computer communicably coupled to the service device 18 via a LAN or the like. The management device 7 includes a user interface for the control and monitoring of the storage apparatus 10, such as GUI (Graphical User Interface) or CLI (Command Line Interface).

Figure 7:
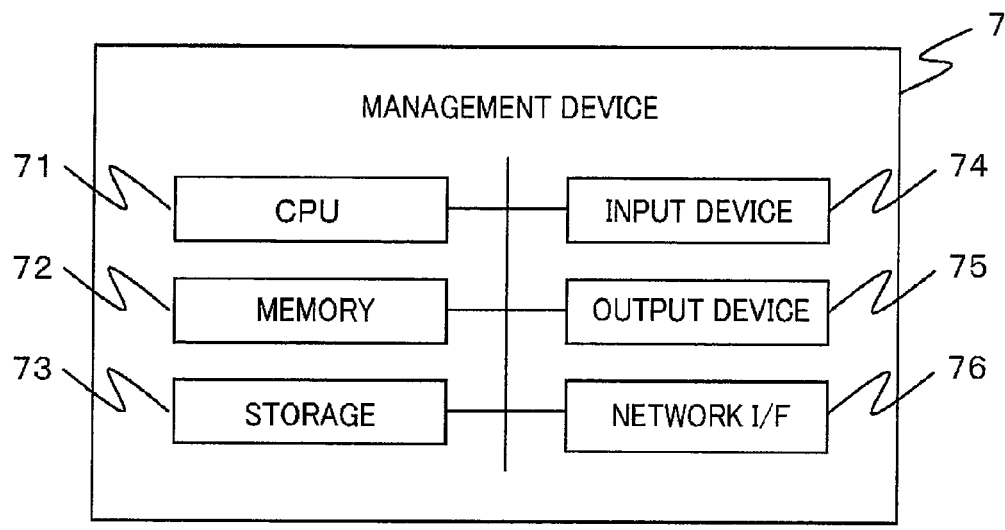
FIG. 7 is a diagram showing a hardware configuration of a management device 7.

FIG. 7 is a hardware example of an information apparatus (computer) usable as the management device 7. As shown in FIG. 7, the management device includes a CPU 71, a volatile or nonvolatile memory 72 (RAM or ROM), a storage 73 (e.g., an HDD (Hard Disk Drive), a semiconductor memory (SSD (Solid State Drive))), an input device 74 such as a keyboard or a mouse, an output device 75 such as a liquid crystal monitor or a printer, and a network interface (network I/F 76) for communication with the service device 18.

Figure 8:
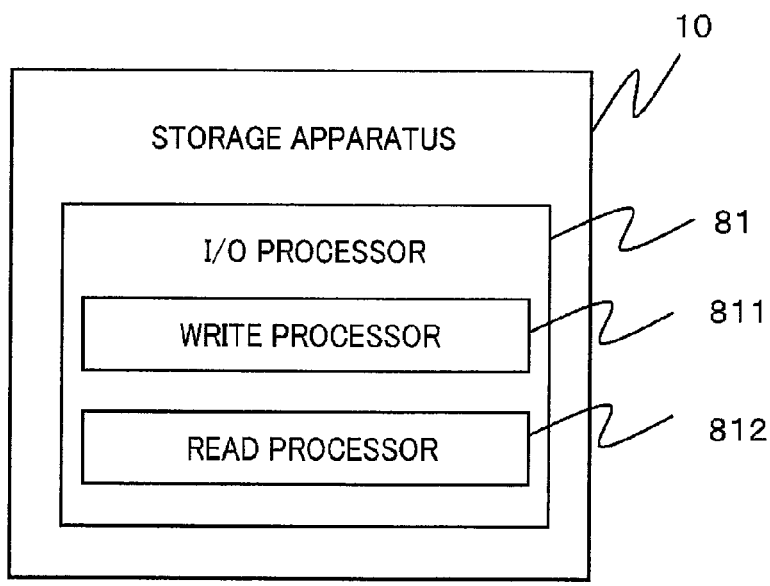
FIG. 8 is a diagram showing main functions of the storage apparatus 10.

FIG. 8 shows basic functions of the storage apparatus 10. As shown in FIG. 8, the storage apparatus 10 includes an I/O processor 81 which has a write processor 811 that performs processing for writing of data into the storage device 17 and a read processor 812 that performs processing for reading of data from the storage device 17. The I/O processor 81 is implemented by the hardware of the channel board 11, the processor board 12, the drive board 13, or the like, or implemented when the processor 112, 122, or 132 reads the micro-program stored in the corresponding memory 113, 123 or 133 and executes the micro-program.

Figure 9:
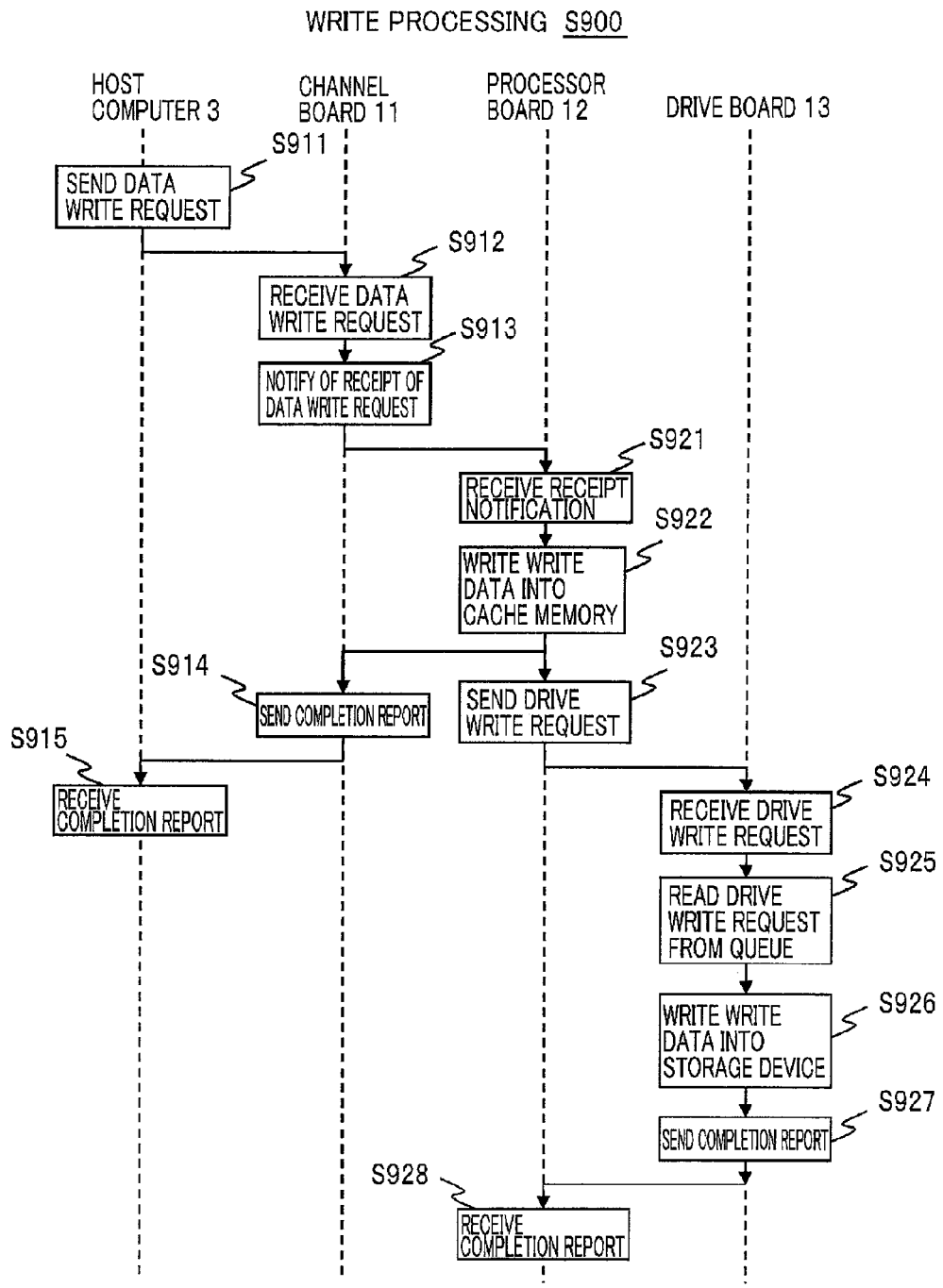
FIG. 9 is a flowchart illustrating data write processing S900.

FIG. 9 is a flowchart illustrating basic processing performed by the write processor 811 of the I/O processor 81 when the storage apparatus 10 receives a frame including a data write request from the host computer 3 (hereinafter referred to as processing S900). The write processing S900 is described below with reference to FIG. 9. Note that, in the following descriptions, a character "S" before each reference numeral means step.

The host computer 3 sends a frame including a data write request, and the channel board 11 of the storage apparatus 10 receives the frame (S911, S912). Upon receipt of the frame, the channel board 11 notifies the processor board 12 and the drive board 13 of the frame receipt (S913).

Upon receipt of the notification from the channel board 11 (S921), the processor board 12 generates a drive write request based on the data write request in the frame, and stores the write data into the cache memory 14. Then, the processor board 12 sends the generated drive write request to the drive board 13 (S922, S923). The channel board 11 sends a completion report to the host computer 3 (S914), and the host computer 3 receives the completion report (S915).

Upon receipt of the drive write request, the drive board 13 registers the drive write request in a write processing queue (S924). The drive board 13 reads the drive write request from the write processing queue as needed (S925). From the cache memory 14, the drive board 13 reads the write data designated by the drive write request thus read, and writes the write data thus read, into the physical drive 171 (S926).

Next, the drive board 13 notifies the processor board 12 of a report indicating that writing of the write data requested by the drive write request has been completed (completion report) (S927), and the processor board 12 receives the completion report thus sent (S928).

Figure 10:
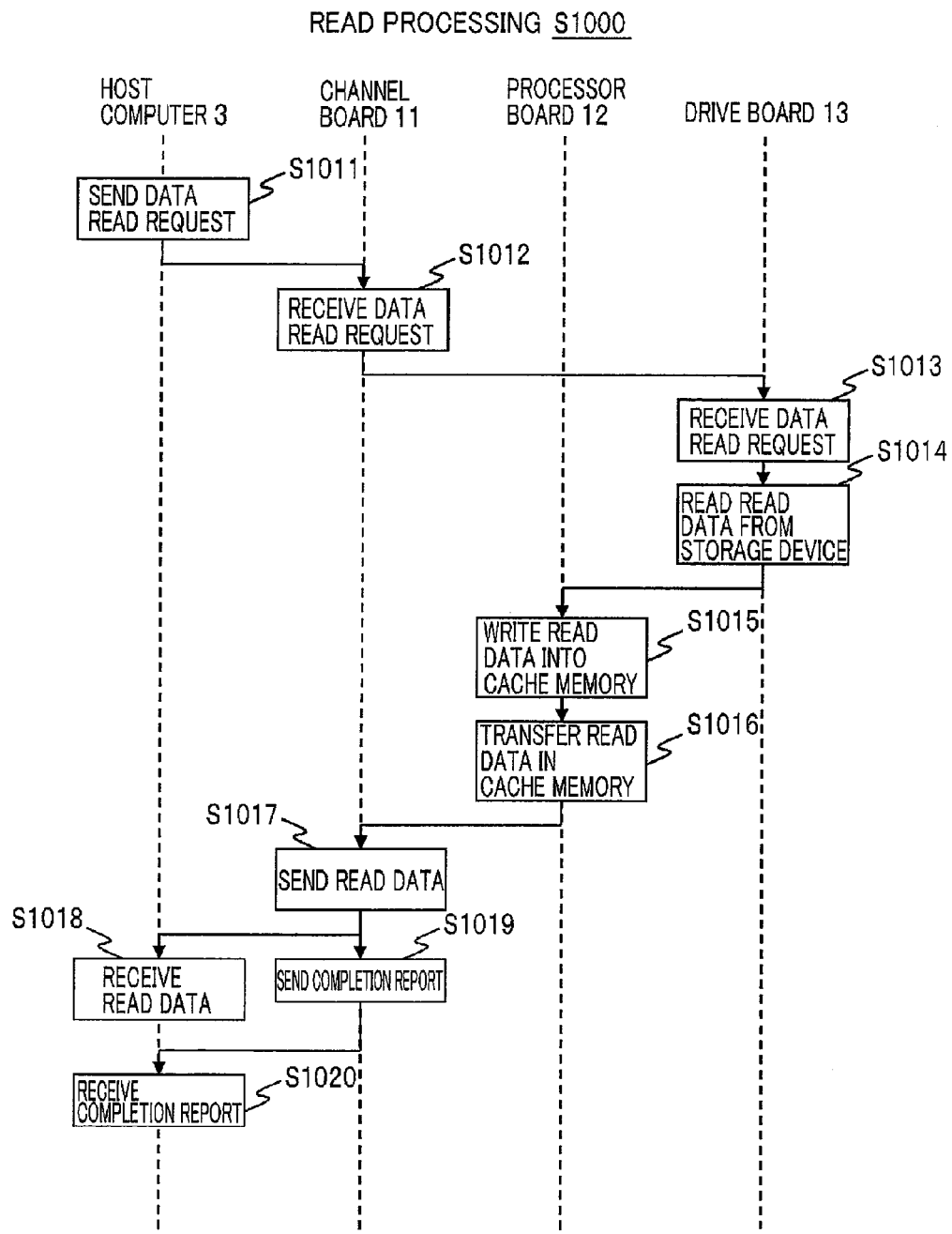
FIG. 10 is a flowchart illustrating data read processing S1000.

FIG. 10 is a flowchart illustrating I/O processing performed by the read processor 812 of the I/O processor 81 of the storage apparatus 10 when the storage apparatus 10 receives a frame including a data read request from the host computer 3 (hereinafter referred to as read processing S1000). The read processing S1000 is described below with reference to FIG. 10.

The host computer 3 sends a frame, and the channel board 11 of the storage apparatus 10 receives the frame (S1011, S1012). Upon receipt of the frame from the host computer 3, the channel board 11 notifies the processor board 12 and the drive board 13 of the frame receipt.

Upon receipt of the notification from the channel board 11 (S1013), the drive board 13 reads, from the storage device 17 (the physical drive 171), data designated by a data read request included in the frame (designated for example with an LBA (Logical Block Address)) (S1014). Note that the processing of reading from the storage device 17 (S1014) is skipped if the data to be read is in the cache memory 14 (in the case of cache hit). The processor board 12 writes the data read by the drive board 13 into the cache memory 14 (S1015). The processor board 12 transfers the data written into the cache memory 14 to the network I/F as needed (S1016).

The channel board 11 sequentially sends the host computer 3 the read data sent from the processor board 12 (S1017, S1018). Upon completion of the read data transmission, the channel board 11 sends a completion report to the host computer 3 (S1019), and the host computer 3 receives the completion report thus sent (S1020).

A network port of the network I/F 36 of the host computer 3 (hereinafter referred to as a host port) is assigned a port ID (e.g., WWN (World Wide Name)) which is identification information identifying a device coupled to the storage network 5. The port ID is assigned to each network port of the network I/F 36. Accordingly, the network I/F 36 having a plurality of network ports for coupling to the storage network 5, for example, has different port IDs for those network ports.

A network port that the channel board 11 of the storage apparatus 10 has in order to be coupled to the storage network 5 (hereinafter referred to as a storage port) is assigned a port ID (e.g., a WWN or MAC address), as well.

Herein, the port ID assigned to the network I/F 36 of the host computer 3 is called a host port ID, and the port ID assigned to each network port of the channel board 11 is called a channel port ID.

The storage apparatus 10 provides the host computer 3 with a storage area of the physical drives 171 on a logical unit (LU) basis. The logical unit is a logical storage area obtained by allocating the storage area of the physical drives 171 with a predetermined allocation unit hereinafter referred to as a physical page). For example, the logical unit is associated with a device file or a drive letter (drive name) in an operating system installed in the host computer 3. Each logical unit is assigned a logical unit number (LUN) which is an identifier unique to the logical unit. The host computer 3 identifies the logical unit by using the'LUN. For example, the LUN is set in a data input/output request sent from the host computer 3 to the storage apparatus 10.

Figure 11:
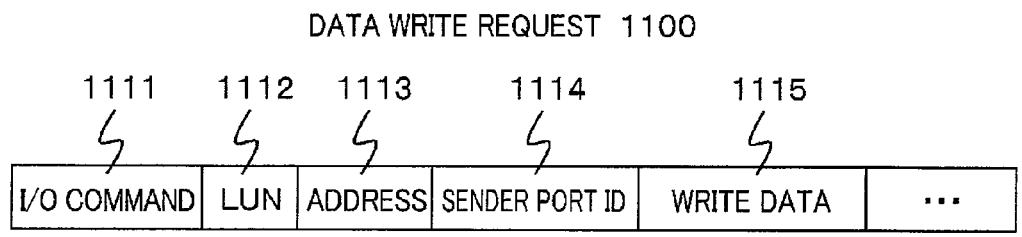
FIG. 11 is a data format example of data write request 1100.

FIG. 11 shows a data format example of a data write request 1100 which the host computer 3 sends the storage apparatus 10 to write data into the storage device 17 of the storage apparatus 10. As shown in FIG. 11, the data write request 1100 includes information such as an I/O command 1111, a LUN 1112, an address 1113, a sender port ID 1114, and write data 1115.

A command to request writing of data into the storage apparatus 10 is set in the I/O command 1111. A LUN of the logical unit into which the data is to be written is set in the LUN 1112. An address designating a storage area into which the data is to be written is set in the address 1113. A host port ID assigned to the network I/F 36 of the host computer 3 that has sent the request is set in the sender port ID 1114. A write data to be written into the storage device 17 with this request is set in the write data 1115.

Figure 12:
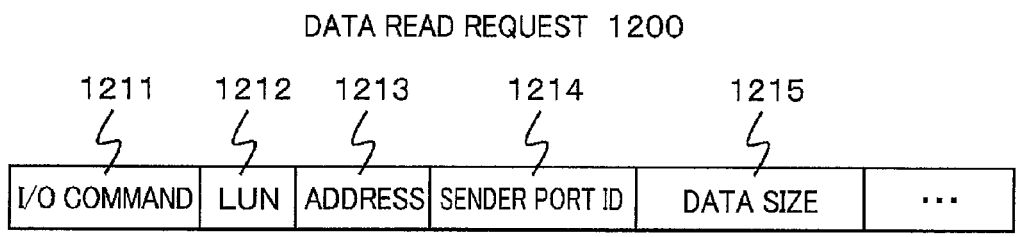
FIG. 12 is a data format example of data read request 1200.

FIG. 12 shows a data format example of a data read request 1200 which the host computer 3 sends to the storage apparatus 10 to read data from the storage device 17 of the storage apparatus 10. As shown in FIG. 12, the data read request 1200 includes information such as an I/O command 1211, a LUN 1212, an address 1213, a sender port ID 1214, and data size 1215.

A command to request reading of data from the storage apparatus 10 is set in the I/O command 1211. A LUN of the logical unit from which the data is to be read is set in the LUN 1212. An address designating a storage area from which the data is to be read is set in the address 1213. A host port ID assigned to the network I/F 36 of the host computer 3 that has sent the request is set in the sender port ID 1214. A data size of the data to be read from the storage device 17 with this request is set in the data size 1215.

The storage apparatus 10 recognizes a physical storage area, provided by the physical drive 171, on a logical device (LDEV) basis, the local device being a storage area set logically using the physical storage area. Each logical device is assigned, as an identifier, a logical device number (LDEV number) unique to the logical device. The following description is given assuming that a storage area of the logical device is configured by controlling a plurality of pieces of hardware with a RAID (Redundant Arrays of Inexpensive (or Independent) Disks) scheme (at least one of RAID 0 to RAID 6).

Figure 13:
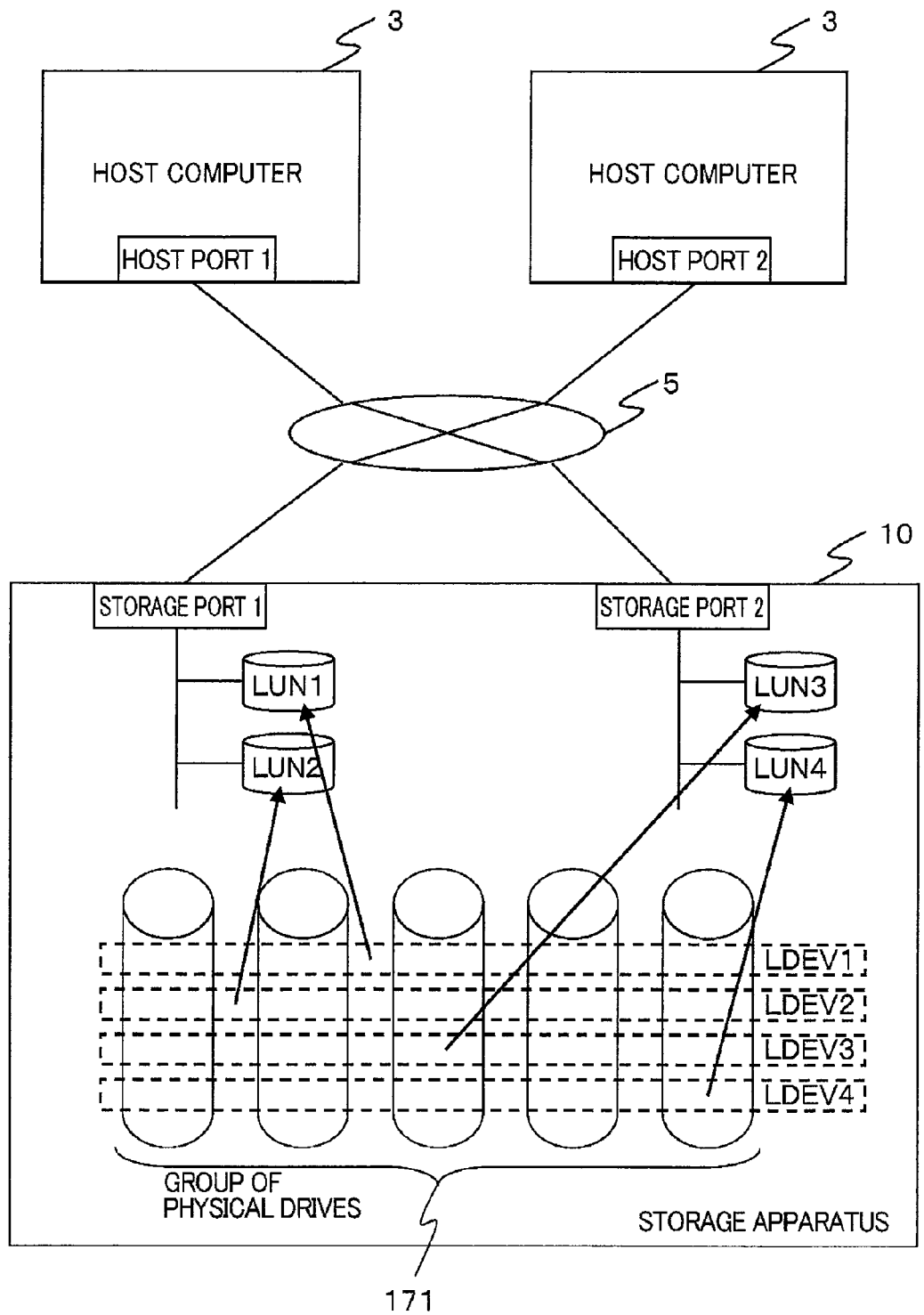
FIG. 13 is a schematic diagram illustrating an access route (path) from the host computer 3 to the storage apparatus 10.

FIG. 13 is a schematic diagram illustrating an access path from the host computer 3 to the storage apparatus 10. As shown in FIG. 13, an access path from the host computer 3 to the storage apparatus 10 can be specified by a combination of a host port ID (host port 1, host port 2, . . . ), a storage port ID (storage port 1, storage port 2, . . . ), a LUN (LUN 1, LUN 2, . . . ), and an LDEV number (LDEV 1, LDEV 2, . . . ).

Figure 14:
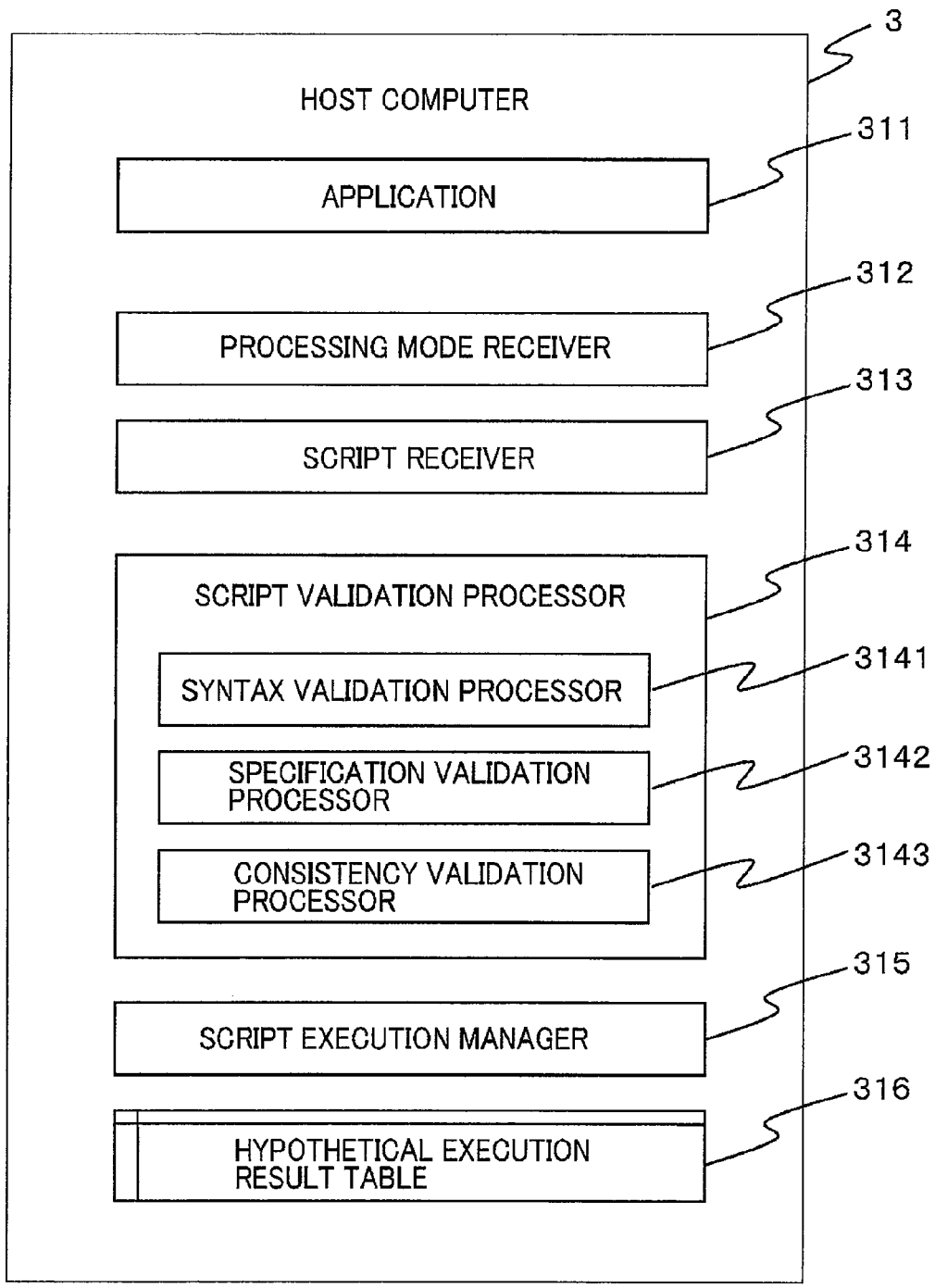
FIG. 14 is a diagram showing functions of and data managed by the host computer 3.

FIG. 14 shows main functions of and data managed by the host computer 3. As shown in FIG. 14, the host computer 3 includes functions of an application 311, a processing mode receiver 312, a script receiver 313, a script validation processor 314, and a script execution manager 315. The script validation processor 314 includes functions of a syntax validation processor 3141, a specification validation processor 3142, and a consistency validation processor 3143.

Note that these functions of the host computer 3 are implemented by hardware of the host computer 3, or when the CPU 31 of the host computer 3 reads and executes a program stored in the memory 32 or the storage 33.

Among those functions, the application 311 provides services provided by the host computer 3, such as, for example, bank's automated teller services or Internet webpage browsing services.

The processing mode receiver 312 receives a designation of a script processing mode (to be described later) from a user, and stores the mode. The script receiver 313 receives, from a user, a script for setting configurations of the storage apparatus 10, which is executed by the storage apparatus 10.

The script validation processor 314 performs syntax validation, specification validation, and consistency validation on the script received by the script receiver 313. The script execution manager 315 sends the storage apparatus 10 an instruction to execute a script validated by the script validation processor 314, and receives a result of the execution from the storage apparatus 10.

As shown in the drawing, the host computer 3 manages (stores) a hypothetical execution result table 316. The hypothetical execution result table 316 will be described in detail later.

Figure 15:
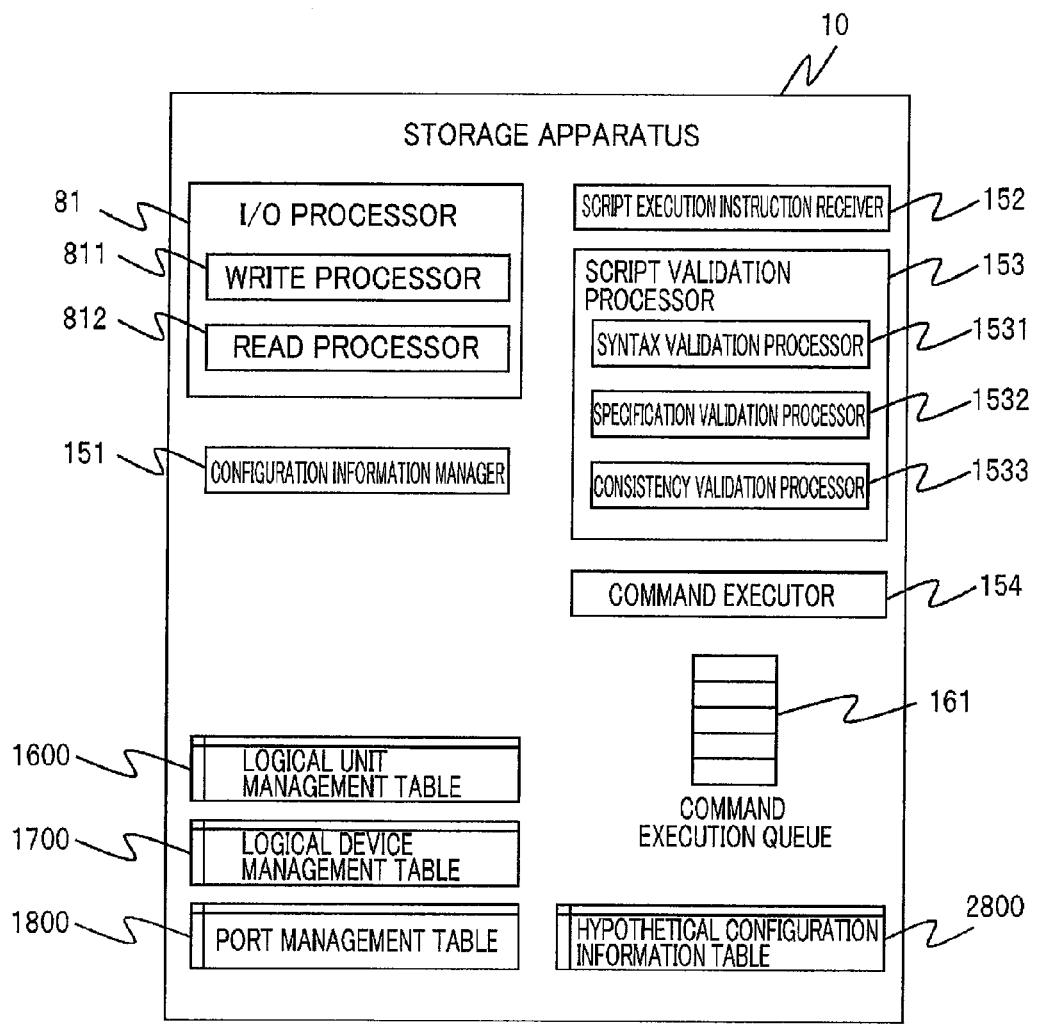
FIG. 15 is a diagram showing functions of and data managed by the storage apparatus 10.

FIG. 15 shows functions of and data managed by the storage apparatus 10. As shown in the drawing, the storage apparatus 10 includes, in addition to the aforementioned I/O processor 81, functions of a configuration information manager 151, a script execution instruction receiver 152, a script validation processor 153, and a command executor 154. Moreover, the storage apparatus 10 manages (stores) a logical unit management table 1600, a logical device management table 1700, a port management table 1800, a hypothetical configuration information table 2800, and a command execution queue 161.

Note that these functions provided by the storage apparatus 10 are implemented by hardware of the channel board 11, processor board 12, drive board 13, or the like of the storage apparatus 10, or when at least one of the processor 112 of the channel board 11, the processor 122 of the processor board 12, the processor 132 of the drive board 13, and the service device 18 reads and executes a program stored in at least one of the memory 113 of the channel board 11, the memory 123 of the processor board 12, the memory 133 of the drive board 13, and the shared memory 15.

The configuration information manager 151 manages information on configurations of each logical unit, storage port, and logical device (information managed in the logical unit management table 1600, the logical device management table 1700, and the port management table 1800). The configuration information manager 151 further manages information on the range of a value that can be set to each configuration (e.g., the range of the LUN, the range of the storage port ID, and the range of the LDEV number). (These pieces of information managed by the configuration information manager 151 are hereinafter collectively referred to as configuration information.) In addition, the configuration information manager 151 provides (sends) the configuration information to the host computer in response to a request from the host computer 3.

The script execution instruction receiver 152 receives and stores a script sent from the script execution manager 315 of the host computer 3.

The script validation processor 153 performs syntax validation, specification validation, and consistency validation on the script received by the script execution instruction receiver 152. When there is no error in syntax, specification, or consistency validation, the script validation processor 153 registers commands described in the script in the command execution queue 161. In the script validation, the script validation processor 153 refers to the hypothetical configuration information table 2800. The hypothetical configuration information table 2800 will be described in detail later.

The command executor 154 sequentially reads and executes the commands registered in the command execution queue 161, waiting to be executed. Then, the command executor 154 sends the host computer 3 a result of the execution.

FIG. 16 shows an example of the logical unit management table 1600. The logical unit management table 1600 manages a correspondence among a logical unit, a storage port to which the logical unit is coupled, and logical devices configuring the logical unit. Specifically, in FIG. 16, a storage port ID is set in a storage port 1611. A LUN of the logical unit is set in a LUN 1612. A LDEV number of the logical devices configuring the logical unit is set in a LDEV number 1613. A storage capacity of the logical unit is set in a storage capacity 1614.

FIG. 17 shows an example of the logical device management table 1700. The logical device management table 1700 manages a correspondence between an LDEV number of a logical device currently set for the storage apparatus 10 and a name set for the logical device (hereinafter referred to as a logical device name). The logical device name is used when, for example, software (an application or an operating system) executed in the host computer 3 or the storage apparatus 10 designates a logical device. In FIG. 17, an LDEV number is set in a LDEV number 1711, and a logical device name is set in a logical device name 1712.

FIG. 18 shows an example of the port management table 1800. The port management table 1800 manages a correspondence between a storage port currently set for the storage apparatus 10 and a name set for the storage port (hereinafter referred to as a storage port name). The storage port name is used when, for example, software executed in the host computer 3 or the storage apparatus 10 designates a storage port. In FIG. 18, a storage port ID is set in a storage port ID 1811, and a storage port name is set in a storage port name 1812.

Next, a description is given of processing, in the information processing system 1 configured in the aforementioned manner, performed by the host computer 3 and the storage apparatus 10 when a user operates the host computer 3 for either script pre-validation or script execution (hereinafter referred to as a script processing operation).

Figures 19, 20:
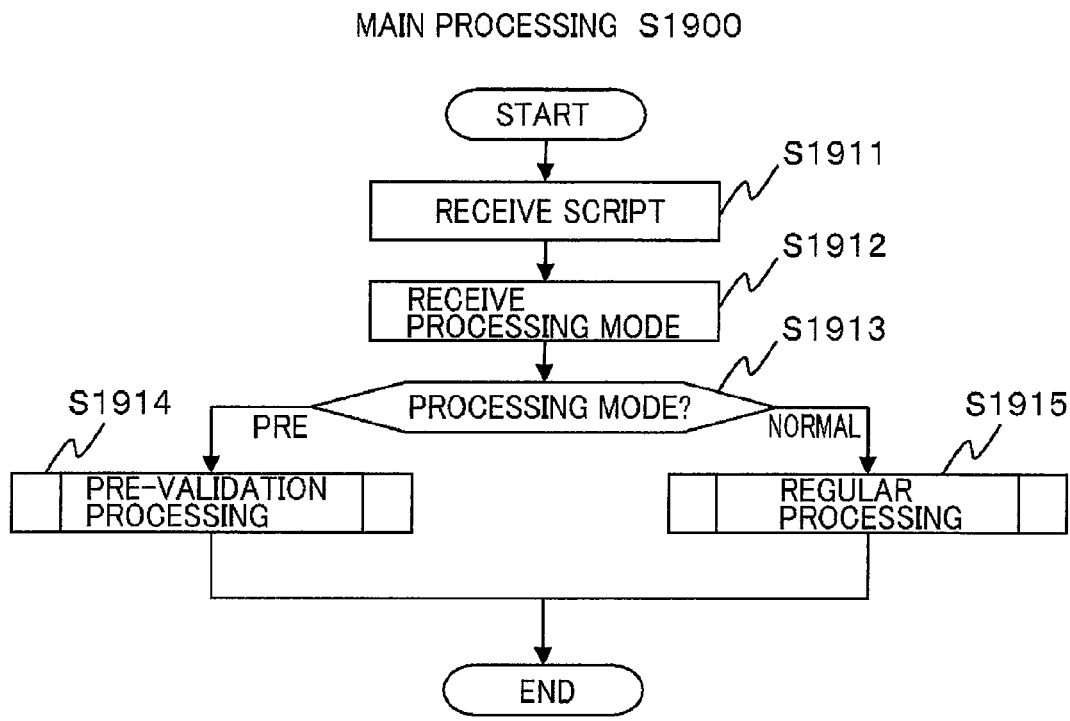
FIG. 19 is a flowchart illustrating main processing S1900.
FIG. 20 is an example of a script that the host computer 3 receives from a user.

FIG. 19 is a flowchart illustrating processing performed by the host computer 3 in response to the script processing operation (hereinafter referred to as main processing S1900). The main processing S1900 is described below with reference to FIG. 19.

First, from a user, the host computer 3 receives a script to be processed (S1911).

FIG. 20 shows an example of a script received from a user. As shown in FIG. 20, the script includes a command line described with data in text format. The command line includes a combination of a command to be executed by the storage apparatus 10 and parameters being set for the command to designate the functions of the command.

The script shown in FIG. 20 consists of four command lines: "raidcfg-a reg-o ldev-pldev 0-ppg PG1-1," "raidcfg-a set-o ldev-pldev 0-pname VOLUME1," "raidcfg-a reg-o ldev-pldev 1-ppg PG2-1," and "raidcfg-a set-o ldev-pldev 1-pname VOLUME2." All of these command lines are related to a command "raidcfg," and a description part that follows the command, such as "-a reg-o ldev-pldev 0-ppg PG1-1," is parameters set for the command. Note that "pg" (or "PG") in the script means a set of a plurality of physical drives 171. For example, a RAID group is generated on a "pg" basis.

In S1912 of FIG. 19, the host computer 3 receives a designation of a processing mode from the user (S1912). Here, the processing mode is information designating a type of processing to be performed on the script received in S1911. In the present embodiment, the user can designate one of two processing modes which are: a mode (hereinafter referred to as "pre-validation mode" (a first processing mode)) that only pre-validates the received script in its syntax, consistency, and the like (the storage apparatus 10 is kept from executing the script); and a mode (hereinafter referred to as "regular mode" (a second processing mode)) that validates the received script in its syntax and specification, and the storage apparatus 10 is given an instruction to execute the received script.

In S1913, the host computer 3 executes processing according to the processing mode received in S1912. To be more specific, when the user designates the "pre-validation mode" (S1913: PRE), the host computer 3 executes processing for this mode (hereinafter referred to as "pre-validation processing S2100") (S1914). When the user designates the "regular mode" (S1913: NORMAL), the host computer 3 executes processing for this mode (hereinafter referred to as "regular processing S2600") (S1915).

As described, in the information processing system 1 of the present embodiment, the user can freely select whether to pre-validate the script or to give an instruction to execute the script.

Figure 21:
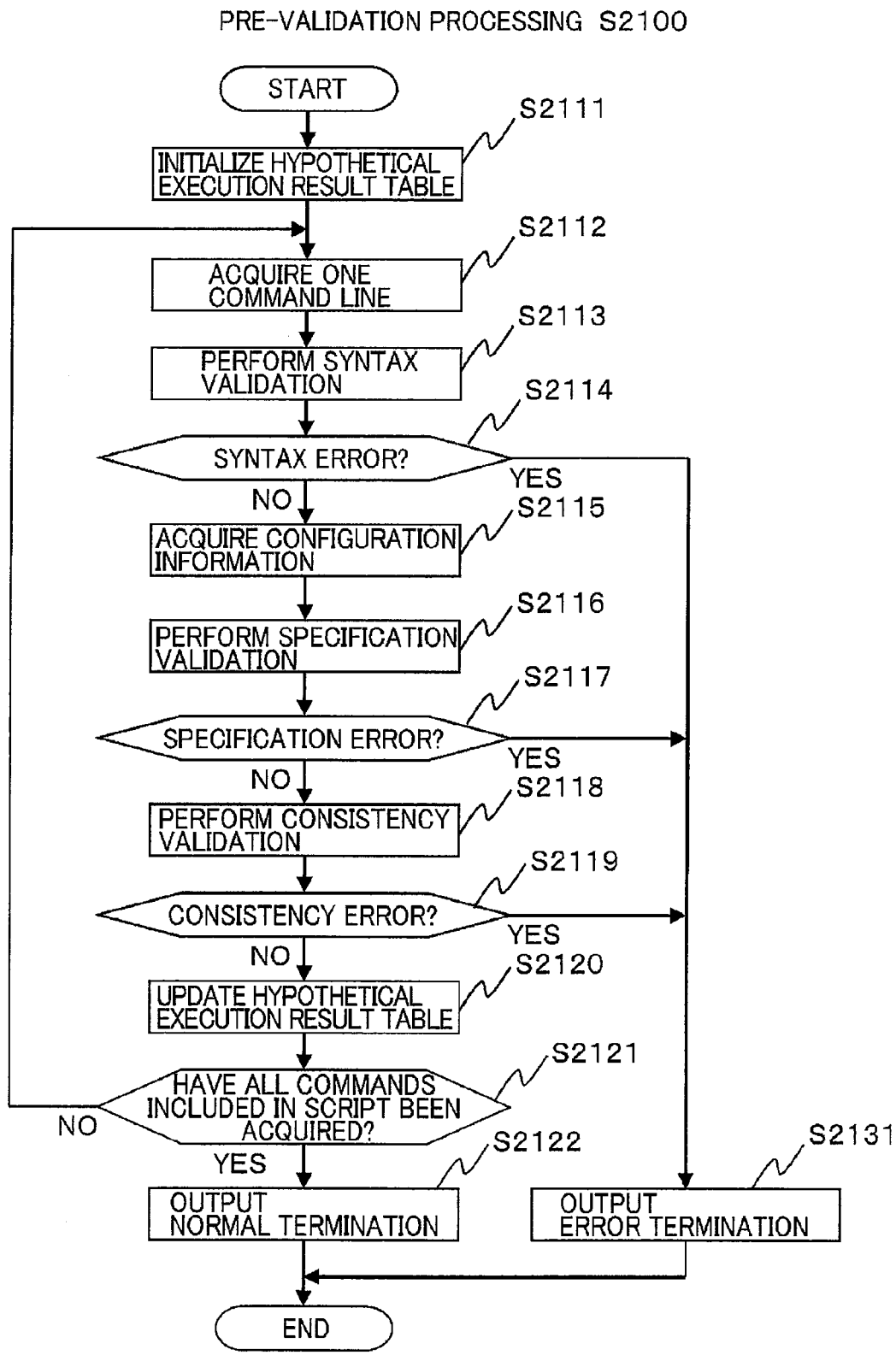
FIG. 21 is a flowchart illustrating pre-validation processing S2100.

FIG. 21 is a flowchart illustrating the pre-validation processing S2100 performed in S1914 of FIG. 19. The pre-validation processing S2100 is described below with reference to FIG. 21.

The host computer 3 first initializes the hypothetical execution result table 316 (S2111). Here, the hypothetical execution result table 316 manages information on configurations that the storage apparatus 10 will have if and after the storage apparatus 10 executes each of commands described in the script (information indicating the latest statuses of the configurations of the storage apparatus 10 after command execution).

FIG. 22 shows an example of the hypothetical execution result table 316. The hypothetical execution result table 316 shown in FIG. 22 manages the statuses of the logical devices of the storage apparatus 10. In FIG. 22, an LDEV number is set in an LDEV number 3161, and a status of a logical device corresponding to the LDEV number is set in a status 3162. Specifically, as a result of the execution of the command described in the script, the status 3162 is set to "generated" when a logical device is generated, or to "not generated" when a logical device corresponding to the LDEV number is not generated yet. A name of the logical device corresponding to the LDEV number is set in a logical device name 3163. Specifically, as a result of the execution of the command described in the script, the logical device name 3163 is set to have a name of a logical device when the logical device name is already set, or to have "-" when the name of the logical device corresponding to the LDEV number is not set yet.

In S2112, the host computer 3 acquires one of the command lines described in the script received in S1911 of FIG. 19. Note that, when a plurality of command lines is described in the script, the host computer 3 acquires a first one of the command lines sequentially every time the host computer 3 executes the processing in S2112.

Next, the host computer 3 performs syntax validation on the command line acquired in S2112 (S2113).

Here, the syntax validation is error detection validation which enables detection without referring to the information on the configurations of the storage apparatus 10 or the hypothetical execution table 316. Examples of the syntax validation include: syntactic grammar validation for determining whether or not the command line is described following the syntactic grammar of the script; numerical validation for determining whether or not the command line is beyond a numeric range that the computer can handle, whether or not the command line includes division by zero, whether or not the command line includes an inconsistent part or misuses a null value, or the like; variable validation for determining whether or not the command line includes inconsistency of the types of variables; and the like.

FIG. 23 shows an example of syntax validation. In the example shown in FIG. 23, the command line has an error because a string "VL123456789012345678901234567890" described in the parameter is too long.

Upon detection of an error as a result of the syntax validation (S2113) (S2114: YES), the host computer 3 outputs a message indicating an abnormality to the output device 35 (S2131), and ends the pre-validation processing S2100. For example, in the example shown in FIG. 23, an error message indicating "range error (string too long)" is outputted to the output device 35. When no error is detected (S2114: NO), the processing proceeds to S2115.

In S2115, the host computer 3 requests configuration information from the storage apparatus 10, and acquires configuration information from the storage apparatus 10.

Subsequently, based on the configuration information acquired in S2115, the host computer 3 performs specification validation of the command line acquired in S2112 (S2116).

Here, the specification validation is for detecting an error that can be detected by comparing the command line with the configuration information of the storage apparatus 10. For example, the specification validation validates whether or not the command line instructs deletion of hardware such as a storage port, whether or not an operation target designated in the command line exists in the storage apparatus 10, and the like.

FIG. 24 shows an example of the specification validation. In Example 1 of FIG. 24, the command line is detected as an error because the content of the command line instructs deletion of a storage port that is a physical configuration and therefore cannot be deleted.

In Example 2, the command line is detected as an error because the content of the command line instructs generation of logical devices having LDEV numbers in a range of "4090 to 4189" even though the LDEV number needs to be set within the range of "0 to 4095."

In Example 3, the command line is detected as an error because the content of the command line instructs generation of a logical unit having a LUN of "5000" even though the LUN needs to be set within the range of "0 to 4095."

In Example 4, the command line is detected as an error because the content of the command line instructs setting of a storage port ID to "511" even though the storage port ID needs to be set within the range of "0 to 255."

Upon detection of an error as a result of the specification validation (S2116) (S2117: YES), the host computer 3 outputs a message indicating an abnormality to the output device 35 (S2131), and then ends the pre-validation processing S2100.

For example, in the example shown in FIG. 24, an error message is outputted to the output device 35, the error message indicating that "the storage port cannot be deleted" (in the case of Example 1), "the LDEV number can be set within the range of 0 to 4095" (in the case of Example 2), "the LUN can be set within the range of 0 to 4095" (in the case of Example 3), or "the storage port ID can be set within the range of 0 to 255" (in the case of Example 4). When no error is detected (S2117: NO), the processing proceeds to S2118.

In S2118, the host computer 3 performs consistency validation of the command line acquired in S2112. Being consistent means that a script includes a description of a command that needs to be executed before a certain command described in the script so that the certain command can function. Further, the consistency validation is to validate whether or not the command line has consistency. The consistency validation is performed by comparing the command line with the content of the hypothetical execution result table 316.

The consistency validation validates, for example, whether or not the command line instructs assignment of a logical device name to a logical device not yet generated, whether or not the command line instructs assignment of a logical unit name to a logical unit not yet generated, and the like. The command line is detected as an error as a result of the consistency validation in the following cases, for example.

(1) A case where, despite an instruction of generation of a logical device, "generated" is set for the logical device in the hypothetical execution result table 316.

(2) A case where, despite an instruction of deletion of a logical device, "not generated" is set for the logical device in the hypothetical execution result table 316.

(3) A case where, despite an instruction of setting of a logical device name for a logical device, "not generated" is set for the logical device in the hypothetical execution result table 316.

(4) A case where, despite an instruction of generation of a logical unit, "generated" is set for the logical unit in the hypothetical execution result table 316.

(5) A case where, despite an instruction of generation of a logical unit, "not generated" is set for a logical device used for the logical unit in the hypothetical execution result table 316.

(6) A case where, despite an instruction of deletion of a logical unit, "not generated" is set for the logical unit in the hypothetical execution result table 316.

(7) A case where, despite an instruction of setting of a LUN for a logical unit, "not generated" is set for the logical unit in the hypothetical execution result table 316.

(8) A case where, despite an instruction of setting of a storage port name for a storage port, "not generated" is set for the storage port in the hypothetical execution result table 316.

FIG. 25 shows an example of the consistency validation. In Example 1, the script is detected as an error because, even though only a logical device having an LDEV number of "0" is generated (generated in the first command line), the content of the second command line instructs generation of a logical device having an LDEV number of "1."

In Example 2, the script is detected as an error because a logical device "LDEV1" designated to be used for a logical unit having a LUN of "0" does not exist.

In Example 3, the script is detected as an error because a logical unit "LUN1" for which the script instructs setting of an attribute does not exist.

In Example 4, the script is detected as an error because a storage port "CL1-B" for which the script instructs setting of an attribute does not exist.

Upon detection of an error as a result of the consistency validation (S2118) (S2119: YES), the host computer 3 outputs a message indicating the abnormality to the output device 35 (S2131), and ends the pre-validation processing S2100. When no error is detected (S2119: NO), the processing proceeds to S2120.

For example, in the example shown in FIG. 25, an error message is outputted to the output device 35, the error message indicating that "the logical device (LDEV1) is not generated" (in the case of Example 1), "the logical device (LDEV1) does not exist" (in the case of Example 2), "the LU (LUN1) does not exist" (in the case of Example 3), or "the storage port (CL1-B) does not exist" (in the case of Example 4).

In S2120, the host computer 3 reflects, in the hypothetical execution result table 316, contents corresponding to the configuration that the storage apparatus 10 will have if and after the storage apparatus 10 executes the command line acquired in S2112.

For example, when the hypothetical execution result table 316 is as shown in FIG. 22 and when the command line acquired in S2112 instructs generation of a logical device having an LDEV number of "50," the host computer 3 sets, for a logical device having "50" in the LDEV number 3161, "generated" in the status 3162 in the hypothetical execution result table 316.

In S2121 thereafter, the host computer 3 determines whether all the command lines described in the script received in S1911 of FIG. 19 have been acquired or not in S2112. If any command line remains not acquired yet (S2121:

NO), processing returns to S2112. If all the command lines have already been acquired (S2121: YES), the host computer 3 outputs, to the output device 35, a message indicating that pre-validation of the script has normally ended (S2122).

As described, the host computer 3 generates configurations that the storage apparatus 10 will have if and after each command described in the script is executed sequentially, and manages those configurations in the hypothetical execution result table 316. Then, the host computer 3 validates the consistency of the script by determining whether each of the commands described in the script can be normally executed or not when the command is executed on the assumption that the storage apparatus 10 has configurations immediately before the execution. Accordingly, whether the script has consistency or not can be validated beforehand automatically.

In addition, the host computer 3 validates whether the script has consistency or not before the storage apparatus 10 executes the script. Consequently, even when the storage apparatus 10 has a limited time range allowing execution of commands, the user can validate whether the script has consistency or not without waiting for the storage apparatus 10 to execute the script. In this manner, the host computer 3 of the present embodiment can perform efficient settings of the configurations of the storage apparatus 10.

Figure 26:
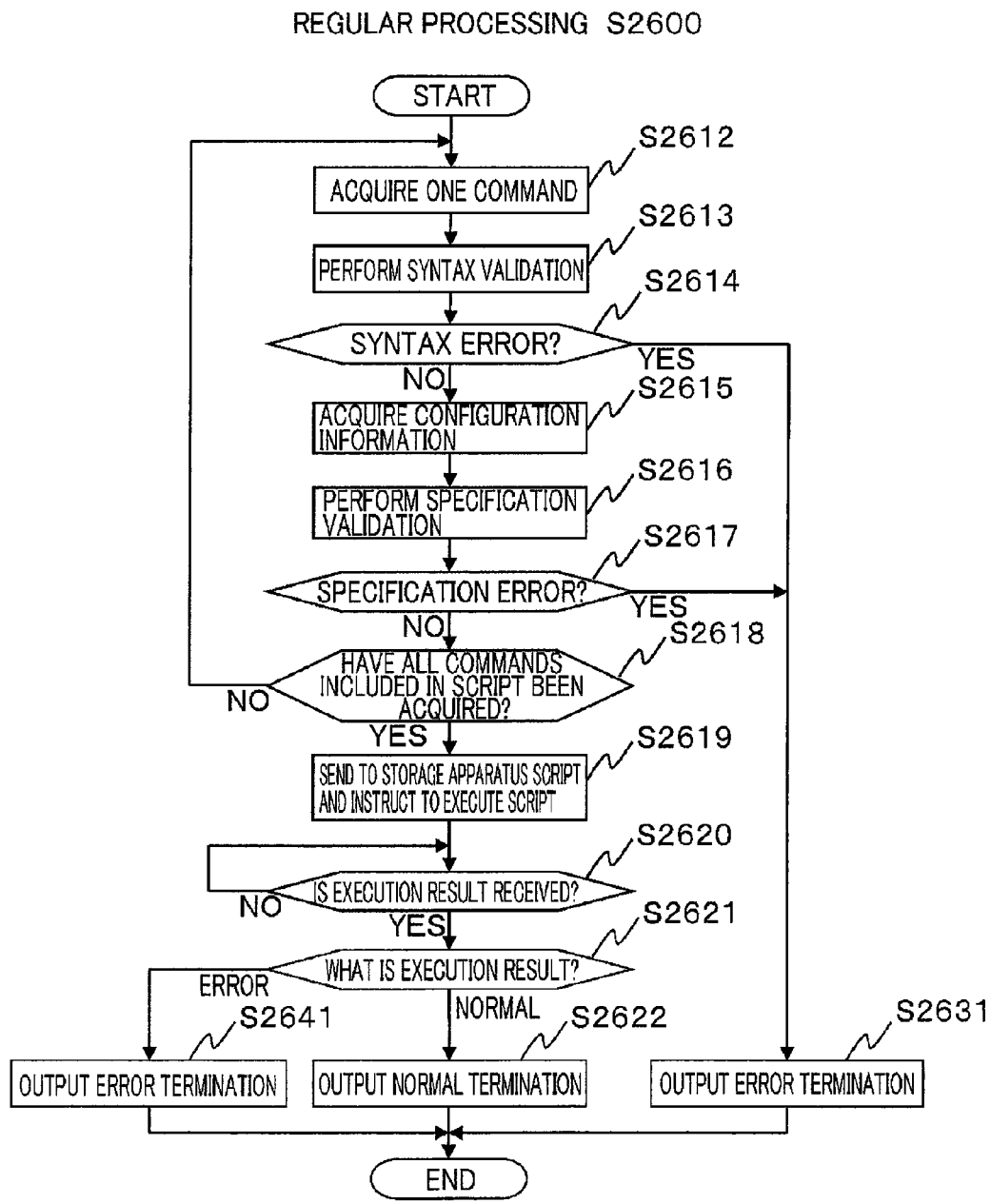
FIG. 26 is a flowchart illustrating regular processing S2600.

FIG. 26 is a flowchart illustrating the regular processing S2600 performed in S1915 of FIG. 19. The regular processing S2600 is described below with reference to FIG. 26.

In FIG. 26, processing steps shown as S2612 to S2618 and S2631 are the same as those of S2112 to S2117, S2121, and S2131 in the pre-validation processing S2100 of FIG. 21. Specifically, the host computer 3 sequentially acquires, one by one, the command lines described in the script received in S1911 of FIG. 19 (S2612, S2618), performs syntax validation in S2613 and then specification validation in S2616 for each of the command lines, and outputs an error message to the output device 35 upon error detection (S2631). Note that unlike the pre-validation processing S2100, the regular processing S2600 does not include processing corresponding to the consistency validation S2118, and therefore processing corresponding to initialization of the hypothetical execution table 316 performed in S2111 is not performed, either.

If none of the command lines described in the script received in S1911 of FIG. 19 has a problem in the syntax validation and the specification validation (S2618: YES), the processing proceeds to S2619.

In 2619, the host computer 3 sends the storage apparatus 10 the script received in S1911 of FIG. 19 and an instruction to execute the script. In S2620, the host computer 3 waits for a result of execution of the script (a result of execution of the commands described in the script) to be sent from the storage apparatus 10.

Receiving the result of the script execution from the storage apparatus 10 (S2620: YES), the host computer 3 determines whether the result of the script execution indicates normal termination or error termination (S2621). If the result is normal termination (S2621: NORMAL), the host computer 3 outputs, to the output device 35, a message indicating that the script execution by the storage apparatus 10 has resulted in normal termination (S2622). If the result is error termination (S2621: ERROR), the host computer 3 outputs, to the output device 35, a message indicating that the script execution by the storage apparatus 10 has resulted in error termination (S2641).

As described above, according to the information processing system 1 of the present embodiment, before the storage apparatus 10 actually executes the script, the host computer 3 can detect an error which would be caused if the storage apparatus 10 executed the script. In addition, in the pre-validation processing S2100, the host computer 3 performs not only the syntax validation and the specification validation, but also the consistency validation which only the storage apparatus 10 can perform conventionally. Accordingly, the host computer 3 can further reliably detect an error which would be caused if the storage apparatus 10 executed the script.

Moreover, since a script with an error removed can be provided to the storage apparatus 10, the script can be prevented beforehand from resulting in an execution error and thus affecting the operations of the storage apparatus 10.

Further, by designating a processing mode, the user can appropriately select between the pre-validation processing S2100 for validating the contents of a script beforehand, including consistency validation, and the regular processing S2600 for performing only syntax validation and specification validation of the script and for causing the storage apparatus 10 to execute the script. In this way, user's needs can be met flexibly.

Figure 27:
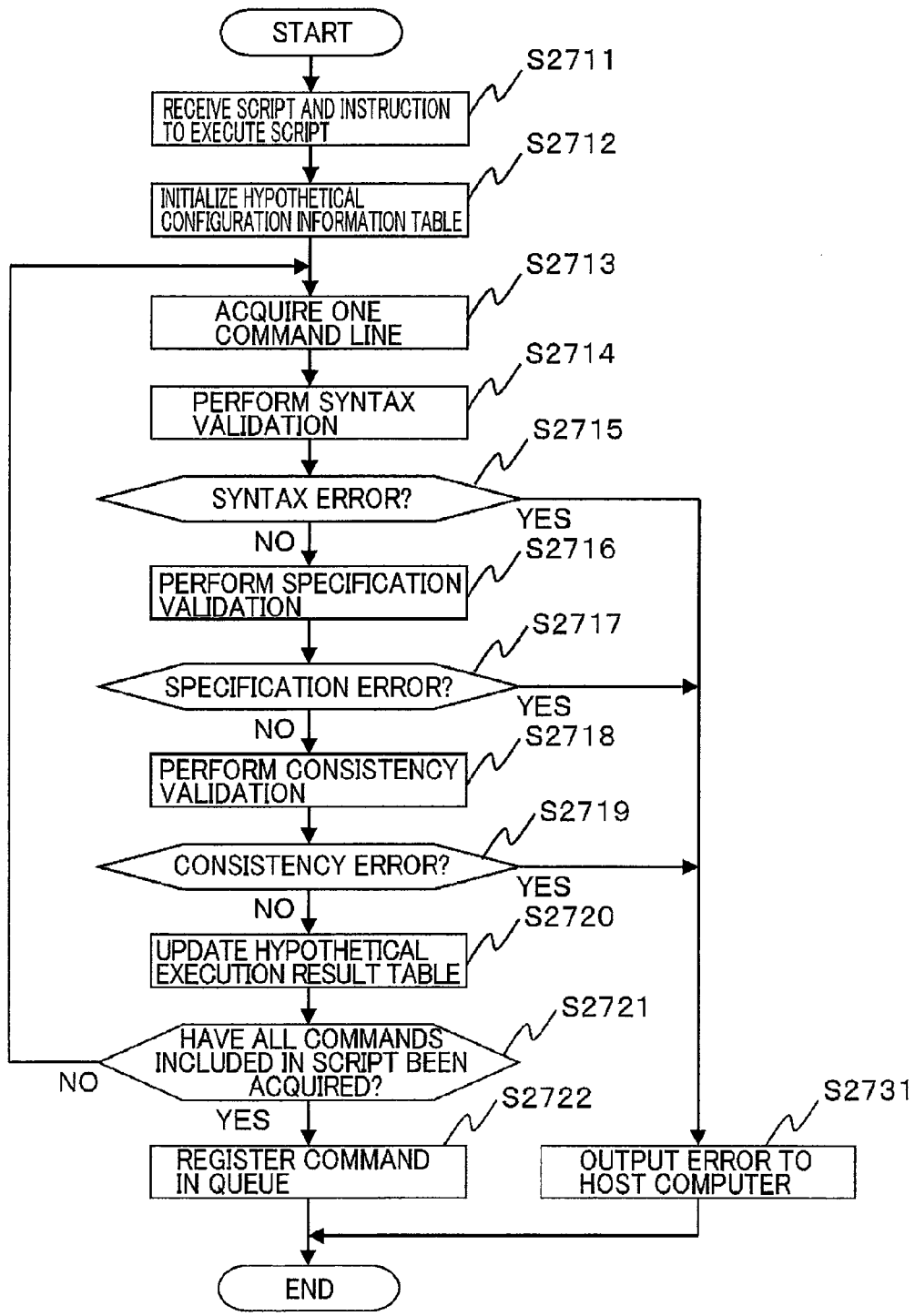
FIG. 27 is a flowchart illustrating pre-script-execution processing S2700.

FIG. 27 is a flowchart illustrating processing performed by the storage apparatus 10 upon receipt of a script and an instruction to execute the script from the host computer 3 (hereinafter referred to as pre-script-execution processing S2700). The pre-script-execution processing S2700 is described below with reference to FIG. 27.

Receiving a script and an instruction to execute the script sent from the host computer 3 (S2711), the storage apparatus 10 first initializes the hypothetical configuration information table 2800 (S2712). The hypothetical configuration information table 2800 manages information on configurations which the storage apparatus 10 will have if and after each command line included in the script is executed.

FIG. 28 shows an example of the hypothetical configuration information table 2800. The hypothetical configuration information table 2800 manages the statuses of the logical devices of the storage apparatus 10. As shown in FIG. 28, an LDEV number is set in an LDEV number 2811, and a status of a logical device corresponding to the LDEV number is set in a status 2812. Specifically, as a result of the execution of the command described in the script, the status 2812 is set to "generated" when a logical device is already generated, or to "not generated" when a logical device corresponding to the LDEV number is not generated yet. A name of the logical device corresponding to the LDEV number is set in a logical device name 2813. Specifically, as a result of the execution of the command described in the script, the logical device name 2813 is set to have a name of a logical device when the logical device name is already set, or to have "-" when the name of the logical device corresponding to the LDEV number is not set yet.

In S2713 of FIG. 27, the storage apparatus 10 acquires one of the command lines described in the script received in S2711. Note that, when the script has a plurality of command lines, the storage apparatus 10 acquires one of the command lines from a top one of the command lines sequentially every time the storage apparatus 10 executes the processing in S2713.

Next, the storage apparatus 10 performs syntax validation of the command line acquired in S2713 (S2714). Note that concrete contents of the syntax validation performed by the storage apparatus 10 are the same as those described in S2113 of FIG. 21.

Upon detection of an error as a result of the syntax validation (S2714) (S2715: YES), the storage apparatus 10 sends the host computer 3 a message indicating an abnormality, as an execution result (S2731), and then ends the pre-script-execution processing S2700. When no error is detected (S2715: NO), the processing proceeds to S2716.

Next, the storage apparatus 10 performs specification validation of the command line acquired in S2713 (S2716). Note that contents of the specification validation performed by the storage apparatus 10 are basically the same as those described in S2116 of FIG. 21.

Upon detection of an error as a result of the specification validation (S2716) (S2717: YES), the storage apparatus 10 sends the host computer 3 a message indicating an abnormality, as an execution result (S2731), and then ends the pre-script-execution processing S2700. When no error is detected (S2717: NO), the processing proceeds to S2718.

The storage apparatus 10 performs consistency validation for the command line acquired in S2713 (S2718). Note that contents of the consistency validation performed by the storage apparatus 10 are the same as that described in S2118 of FIG. 21. Note that the consistency validation is performed referring to the contents of the hypothetical configuration information table 2800. For example, the command line is detected as an error in the following cases.

(1) A case where, despite an instruction of generation of a logical device, "generated" is set for the logical device in the hypothetical configuration information table 2800.

(2) A case where, despite an instruction of deletion of a logical device, "not generated" is set for the logical device in the hypothetical configuration information table 2800.

(3) A case where, despite an instruction of setting of a logical device name for a logical device, "not generated" is set for the logical device in the hypothetical configuration information table 2800.

(4) A case where, despite an instruction of generation of a logical unit, "generated" is set for the logical unit in the hypothetical configuration information table 2800.

(5) A case where, despite an instruction of generation of a logical unit, "not generated" is set for a logical device used for the logical unit in the hypothetical configuration information table 2800.

(6) A case where, despite an instruction of deletion of a logical unit, "not generated" is set for the logical unit in the hypothetical configuration information table 2800.

(7) A case where, despite an instruction of setting of a LUN for a logical unit, "not generated" is set for the logical unit in the hypothetical configuration information table 2800.

(8) A case where, despite an instruction of setting of a storage port name for a storage port, "not generated" is set for the storage port in the hypothetical configuration information table 2800.

Upon detection of an error as a result of the consistency validation (S2718) (S2719: YES), the storage apparatus 10 sends the host computer 3 an execution result including a message indicating an abnormality (S2731), and then ends the pre-script-execution processing S2700. When no error is detected (S2719: NO), processing proceeds to S2720.

In S2720, the storage apparatus 10 reflects, in the hypothetical configuration information table 2800, contents corresponding to a configuration which the storage apparatus 10 will have if and after the storage apparatus 10 executed a command of the command line acquired in S2713. Concrete contents of this processing are the same as those described in S2120 of FIG. 21.

In S2721 thereafter, the storage apparatus 10 determines whether or not all the command lines described in the script received in S2711 have been acquired in S2713. If any command line remains not acquired yet (S2721: NO), the processing returns to S2713.

On the other hand, if all the command lines have already been acquired (S2721: YES), the storage apparatus 10 registers commands of all the command lines described in the script received in S2711, in the command execution queue 161 so that the commands will be executed in the order in which they are described in the script (S2722).

As described, before actually executing a script, the storage apparatus 10 performs syntax validation, specification validation, and consistency validation of the script. In this way, in the information processing system 1 of the present embodiment, in addition to the validations performed by the host computer 3, the storage apparatus 10 also performs syntax validation, specification validation, and consistency validation of the script again before executing the script. Accordingly, it can be reliably prevented that the storage apparatus 10 executes a script having an error.

Figure 29:
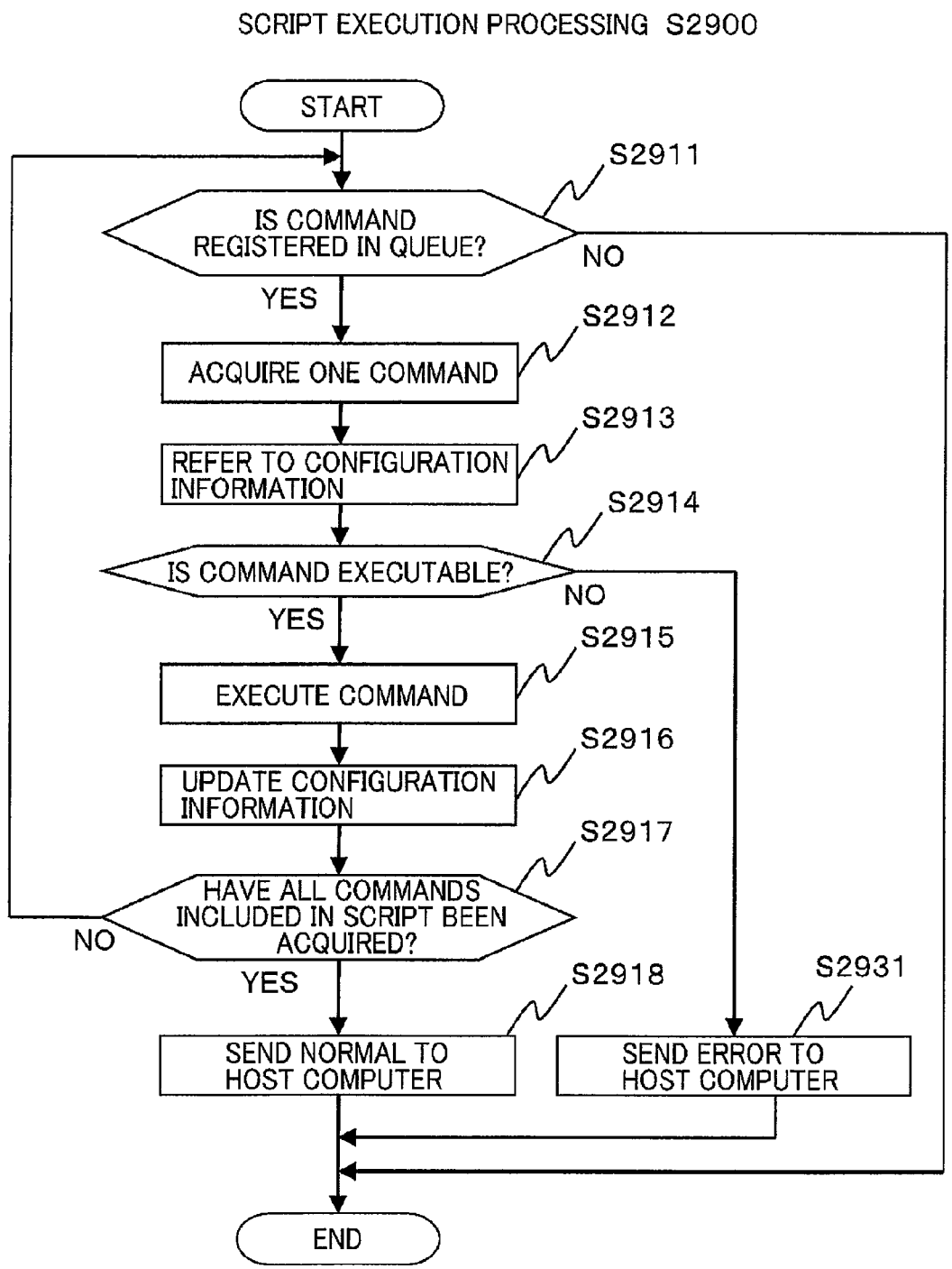
FIG. 29 is a flowchart illustrating script execution processing S2900.

When a time for executing the script comes, the storage apparatus 10 sequentially reads from the command execution queue 161 the commands registered in the command execution queue 161 in S2722 of FIG. 29 and executes them. Note that the storage apparatus 10 executes the script at a timing scheduled in advance, for example.

FIG. 29 is a flowchart illustrating processing performed by the storage apparatus 10 when the storage apparatus 10 reads commands from the command execution queue 161 and executes the commands (hereinafter referred to as script execution processing S2900). The script execution processing S2900 is described below with the drawing.

First, the storage apparatus 10 checks whether a command is registered in the command execution queue 161 or not (S2911). If no command is registered in the command execution queue 161 (S2911: NO), processing ends. If a command is registered in the command execution queue 161 (S2911: YES), processing proceeds to S2912.

In S2912, the storage apparatus 10 acquires one command registered in the command execution queue 161.

Next, the storage apparatus 10 refers to configuration information (not the hypothetical configuration information table 2800) (S2913), and determines whether the command acquired in S2912 is executable or not (S2914). This determination is made in the same manner as that described for S2716 of FIG. 27.

When the command is determined as being not executable (S2914: NO), the storage apparatus 10 sends the host computer 3 an execution result including a message indicating an error (S2931), and then ends the processing. On the other hand, when the command is determined as being executable (S2914: YES), the storage apparatus 10 executes the command acquired in S2912 (S2915), and then reflects configuration obtained by the execution to the configuration information (S2916).

In S2917, the storage apparatus 10 determines whether all the commands described in the script received from the host computer 3 in S2711 have been executed or not. If not all the commands have been executed (S2917: NO), processing returns to S2911. If all the commands have been executed (S2917: YES), the storage apparatus 10 sends the host computer 3 an execution result including a message indicating normality (S2918), and then ends the processing.

The preferred embodiment of the present invention has been described above, but the embodiment is intended to facilitate understanding of the present invention, not to limit the scope of the present invention. The present invention can be implemented in other various aspects.

For example, the above-described functions of the host computer 3 may be implemented by the management device 7 coupled to the storage apparatus 10.

The invention claimed is:

1. An information apparatus communicably coupled to a storage apparatus, which validates a script, describing a plurality of commands, executed by the storage apparatus for setting a configuration of the storage apparatus, the information apparatus comprising:
   a processor; and
   a memory storing instructions which, when executed by the processor, cause the processor to perform acts including:
   generating a configuration of the storage apparatus after each command described in the script is executed sequentially such that a plurality of configurations are generated for the storage apparatus according to the sequential execution of the script; and
   performing consistency validation on the script by determining whether or not each of the commands described in the script is normally executable in a case where each respective command is to be executed according to the configuration generated immediately prior to the execution of the respective command.

2. The information apparatus according to claim 1, wherein the information apparatus receives a designation of a processing mode for the script;
   the memory stores instructions which, when executed by the processor, further causes acts including:
   performing the consistency validation on the script in a case a first processing mode is received as the processing mode;
   sending to the storage apparatus an instruction that allows the storage apparatus to execute the script without performing the consistency validation on the script in a case a second processing mode is received as the processing mode;
   performing a syntax validation and a specification validation along with the consistency validation on the commands described in the script in a case the first processing mode is received as the processing mode; and
   performing the syntax validation and the specification validation but not the consistency validation on the commands described in the script, and sends to the storage apparatus an instruction that allows the storage apparatus to execute the script in a case the second processing mode is received as the processing mode,
   the syntax validation is validation that can be performed without reference to the configurations of the storage apparatus,
   the specification validation is validation that is performed with reference to the configurations of the storage apparatus,
   the storage apparatus manages as the configurations thereof: a logical device that is a storage area provided by a physical recordable medium, a logical unit that is a logical storage area provided to the information apparatus using the storage apparatus, a network port of the storage apparatus used as a communication route when the information apparatus accesses the logical unit, and a correspondence between the logical device and the logical unit,
   the commands described in the script include at least one of a command that sets a name for the logical device or the logical unit, a command that associates the logical device with the logical unit, and a command that sets an attribute for the network port, the information apparatus functions as a host computer that sends a data I/O request to the storage apparatus, and the storage apparatus includes:
- a cache memory;
- a drive board that writes data into or reads data from a physical drive that is a physical recordable medium;
- a channel board that communicates with the information apparatus and receives the data I/O request; and
- a processor board that performs data transfer between the information apparatus and the cache memory and data transfer between the cache memory and the physical drive, in accordance with the data I/O request.

3. The information apparatus according to claim 1, wherein
the information apparatus receives a designation of a processing mode for the script;
the memory stores instructions which, when executed by the processor, further cause acts including:
performing the consistency validation on the commands described in the script in a case a first processing mode is received as the processing mode; and
sending to the storage apparatus an instruction that allows the storage apparatus to execute the script without performing the consistency validation on the commands described in the script in a case a second processing mode is received as the processing mode.

4. The information apparatus according to claim 1, wherein
the information apparatus receives a designation of a processing mode for the script;
the memory stores instructions which, when executed by the processor, further cause acts including:
performing a syntax validation and a specification validation along with the consistency validation on the commands described in the script in a case a first processing mode is received as the processing mode; and
performing the syntax validation and the specification validation but not the consistency validation on the commands described in the script, and sends to the storage apparatus an instruction that allows the storage apparatus to execute the script in a case a second processing mode is received as the processing mode.

5. The information apparatus according to claim 4, wherein
the syntax validation is validation that can be performed without reference to the configurations of the storage apparatus,
the specification validation is validation that is performed with reference to the configurations of the storage apparatus.

6. The information apparatus according to claim 1, wherein
the storage apparatus manages as the configurations thereof a logical device that is a storage area provided by a physical recordable medium, and a logical unit that is a logical storage area provided to a device using the storage apparatus, and
one or more of the commands are executed on an assumption that the logical device or the logical unit exists.

7. The information apparatus according to claim 6, wherein one or more of the commands sets a name for the logical device or the logical unit.

8. The information apparatus according to claim 1, wherein
the storage apparatus manages as the configuration thereof:
an association with a logical device that is a storage area provided by a physical recordable medium and a logical unit that is a logical storage area provided to the information apparatus using the storage apparatus, and
one or more of the commands associates the logical device with the logical unit.

9. The information apparatus according to claim 1, wherein
the storage apparatus manages as the configuration thereof:
a logical device that is a storage area provided by a physical recordable medium, a logical unit that is a logical storage area provided to the information apparatus using the storage apparatus, and a network port of the storage apparatus used as a communication route when the device accesses the logical unit, and
one or more of the commands are executed on an assumption that the network port exists.

10. The information apparatus according to claim 9, wherein one or more of commands sets an attribute for the network port.

11. The information apparatus according to claim 1, wherein
the information apparatus is a host computer that sends a data I/O request to the storage apparatus, and
the storage apparatus includes:
- a cache memory;
- a drive board that writes data into or reads data from a physical drive that is a physical recordable medium;
- a channel board that communicates with the information apparatus and receives the data I/O request; and
- a processor board that performs data transfer between the information apparatus and the cache memory and data transfer between the cache memory and the physical drive, in accordance with the data I/O request.

12. A method for controlling an information apparatus communicably coupled to a storage apparatus, which validates a script, describing a plurality of commands, executed by the storage apparatus for setting a configuration of the storage apparatus, comprising:
generating, by the information apparatus, configurations of the storage apparatus after each command described in the script is executed sequentially such that a plurality of configurations are generated for the storage apparatus according to the sequential execution of the commands described in the script; and
performing by the information apparatus consistency validation on the script by determining whether or not each of the commands described in the script is normally executable in a case where each respective command is to be executed according to the configuration generated immediately prior to the execution of the respective command.

13. The method for controlling an information apparatus according to claim 12, further comprising:
receiving, by the information apparatus, a designation of a processing mode for the script;
performing the consistency validation on the commands described in the script in a case a first processing mode is received as the processing mode;
sending to the storage apparatus an instruction that allows the storage apparatus to execute the script without performing the consistency validation on the commands described in the script in a case a second processing mode is received as the processing mode.

14. The method for controlling an information apparatus according to claim 12, further comprising:
receiving, by the information apparatus, a designation of a processing mode for the script;

performing a syntax validation and a specification validation along with the consistency validation on the commands described in the script in a case a first processing mode is received as the processing mode; and performing the syntax validation and the specification validation but not the consistency validation on the commands described in the script, and sends to the storage apparatus an instruction that allows the storage apparatus to execute the script in a case a second processing mode is received as the processing mode.

* * * * *